(12) United States Patent
Niewiadomski et al.

(10) Patent No.: US 12,286,156 B2
(45) Date of Patent: Apr. 29, 2025

(54) TRAILER GPS LOCATION STORAGE AND RECALL FOR HITCH ASSIST OPERATION

(71) Applicant: Ford Global Technologies, LLC, Dearborn, MI (US)

(72) Inventors: Luke Niewiadomski, Dearborn, MI (US); George Edmund Walley, Novi, MI (US); Arnav Sharma, Canton, MI (US); Roger Arnold Trombley, Ann Arbor, MI (US); Frederic Christen, Walhorn (BE); Kyle Simmons, New Boston, MI (US); Li Xu, Northville, MI (US); Eric Hongtei Tseng, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 536 days.

(21) Appl. No.: 16/870,079

(22) Filed: May 8, 2020

(65) Prior Publication Data

US 2021/0347410 A1 Nov. 11, 2021

(51) Int. Cl.
*B62D 15/02* (2006.01)
*B60R 1/26* (2022.01)
*B60R 11/04* (2006.01)
*B62D 13/06* (2006.01)
*G01S 19/39* (2010.01)
(Continued)

(52) U.S. Cl.
CPC .............. *B62D 15/028* (2013.01); *B60R 1/26* (2022.01); *B60R 11/04* (2013.01); *B62D 13/06* (2013.01); *B62D 15/021* (2013.01); *G01S 19/393* (2019.08); *G05D 1/0212* (2013.01); *B60R 1/31* (2022.01)

(58) Field of Classification Search
CPC .... B62D 15/028; B62D 13/06; B62D 15/021; B62D 15/0285; B60R 11/04; B60R 2300/808; B60R 1/00; B60R 1/26; B60R 1/31; G01S 19/393; G05D 1/0212; G05D 1/028; G05D 1/0225; G05D 2201/0213
See application file for complete search history.

(56) References Cited

U.S. PATENT DOCUMENTS 5,155,684 A 10/1992 Burke et al.
5,331,561 A 7/1994 Barrett et al.
(Continued)

FOREIGN PATENT DOCUMENTS

EP 1913235 B1 4/2011
JP 2010073080 A 4/2010

*Primary Examiner* — Sze-Hon Kong
(74) *Attorney, Agent, or Firm* — Lorne Forsythe; Price Heneveld LLP

(57) ABSTRACT

A system for assisting in aligning a vehicle for hitching with a trailer includes a vehicle steering system, a detection system outputting a signal including scene data of an area to a rear of the vehicle, and a controller that controls the vehicle steering system to maneuver the vehicle according to an initial alignment maneuver that positions the vehicle relative to the trailer, such that the trailer is within the area to the rear of the vehicle. The controller further receives the scene data and identifies the trailer within the area to the rear of the vehicle, derives a backing path to align a hitch ball mounted on the vehicle to a coupler of the trailer, and controls the vehicle steering system to maneuver the vehicle including reversing along the backing path.

15 Claims, 19 Drawing Sheets

(51) Int. Cl.
*G05D 1/00* (2006.01)
*B60R 1/31* (2022.01)

(56) References Cited

U.S. PATENT DOCUMENTS

| | | | |
|---|---|---|---|
| 5,615,116 A | 3/1997 | Gudat et al. | |
| 6,687,609 B2 | 2/2004 | Hsiao et al. | |
| 8,179,238 B2 | 5/2012 | Roberts, Sr. et al. | |
| 9,446,713 B2* | 9/2016 | Lu | B60R 1/00 |
| 9,696,723 B2* | 7/2017 | Zeng | G05D 1/0212 |
| 9,709,986 B2 | 7/2017 | Gdalyahu et al. | |
| 9,834,140 B2* | 12/2017 | Windeler | B60R 1/00 |
| 10,126,755 B1* | 11/2018 | Lavi | B60D 1/62 |
| 10,150,505 B2* | 12/2018 | Herzog | B62D 15/0295 |
| 10,214,062 B2* | 2/2019 | Hüger | B60D 1/36 |
| 10,351,061 B1* | 7/2019 | Chaudhari | B60R 1/00 |
| 10,384,612 B2* | 8/2019 | Bochenek | G06F 3/04842 |
| 10,841,127 B1* | 11/2020 | Greer | H04W 4/40 |
| 11,030,476 B2* | 6/2021 | Xu | G06V 10/20 |
| 11,198,340 B2* | 12/2021 | Ramirez Llanos | B60R 1/00 |
| 11,250,372 B2* | 2/2022 | Pike | G06Q 10/0834 |
| 11,995,602 B2* | 5/2024 | Pike | G06Q 10/0834 |
| 2002/0145662 A1* | 10/2002 | Mizusawa | B60D 1/62 348/113 |
| 2002/0145663 A1* | 10/2002 | Mizusawa | B62D 15/029 348/118 |
| 2005/0131645 A1* | 6/2005 | Panopoulos | G05D 1/0244 701/472 |
| 2006/0181391 A1* | 8/2006 | McNeill | G05B 15/02 340/5.61 |
| 2007/0050108 A1* | 3/2007 | Larschan | G07C 5/085 701/33.4 |
| 2009/0236825 A1* | 9/2009 | Okuda | B60D 1/36 348/148 |
| 2010/0013188 A1* | 1/2010 | Ortmann | B60D 1/36 280/477 |
| 2012/0283909 A1 | 11/2012 | Dix | |
| 2013/0226390 A1* | 8/2013 | Luo | B60D 1/36 348/148 |
| 2014/0358417 A1* | 12/2014 | Lavoie | B60W 30/00 701/300 |
| 2016/0019497 A1* | 1/2016 | Carvajal | H04L 67/104 705/333 |
| 2016/0050356 A1* | 2/2016 | Nalepka | H04N 7/181 348/148 |
| 2016/0052548 A1* | 2/2016 | Singh | B62D 15/028 701/41 |
| 2016/0068158 A1* | 3/2016 | Elwart | B60W 30/06 701/1 |
| 2016/0152263 A1* | 6/2016 | Singh | B60T 8/1708 701/41 |
| 2017/0022015 A1* | 1/2017 | Göllü | G06K 7/1413 |
| 2017/0043967 A1* | 2/2017 | Walford | B65G 69/003 |
| 2018/0312022 A1* | 11/2018 | Mattern | B62D 15/0285 |
| 2018/0324390 A1* | 11/2018 | Hill | H04N 5/33 |
| 2019/0064835 A1* | 2/2019 | Hoofard | B60T 7/22 |
| 2019/0066503 A1* | 2/2019 | Li | G08G 1/012 |
| 2019/0086927 A1* | 3/2019 | Skvarce | B60D 1/36 |
| 2019/0187716 A1* | 6/2019 | Cantrell | G05D 1/0225 |
| 2019/0337343 A1* | 11/2019 | Ramirez Llanos | B60D 1/36 |
| 2019/0375450 A1* | 12/2019 | Medagoda | B62D 15/0285 |
| 2020/0031353 A1* | 1/2020 | Kraftschik | B60D 1/06 |
| 2020/0055357 A1* | 2/2020 | Laine | B60D 1/58 |
| 2020/0097021 A1* | 3/2020 | Carpenter | G05D 1/243 |
| 2020/0184412 A1* | 6/2020 | Champa | H04W 4/40 |
| 2020/0262257 A1* | 8/2020 | Köster | B60D 1/62 |
| 2020/0273133 A1* | 8/2020 | Morris | G06Q 10/06315 |
| 2020/0276934 A1* | 9/2020 | Hüger | B60D 1/36 |
| 2020/0349501 A1* | 11/2020 | Ayoub | G06T 7/70 |
| 2020/0406967 A1* | 12/2020 | Yunus | B62D 15/028 |
| 2021/0053407 A1* | 2/2021 | Smith | B25J 9/1669 |
| 2021/0082220 A1* | 3/2021 | Boerger | B65G 69/2882 |
| 2021/0142588 A1* | 5/2021 | Arena | G07C 9/00896 |
| 2021/0232142 A1* | 7/2021 | Mepham | B60R 11/04 |
| 2021/0256467 A1* | 8/2021 | Zuckerman | B25J 9/1669 |
| 2021/0398045 A1* | 12/2021 | Hanebeck | G06Q 10/06315 |
| 2022/0048497 A1* | 2/2022 | Delizo | B60W 10/04 |
| 2022/0055430 A1* | 2/2022 | Delizo | B62D 15/0285 |
| 2022/0170311 A1* | 6/2022 | McNeill | G05B 15/02 |
| 2022/0287239 A1* | 9/2022 | Faust | B60K 37/06 |

* cited by examiner

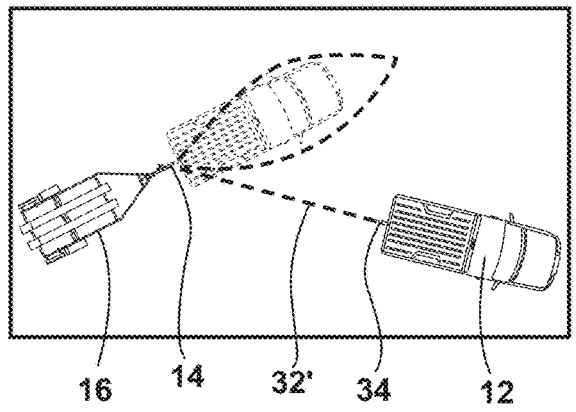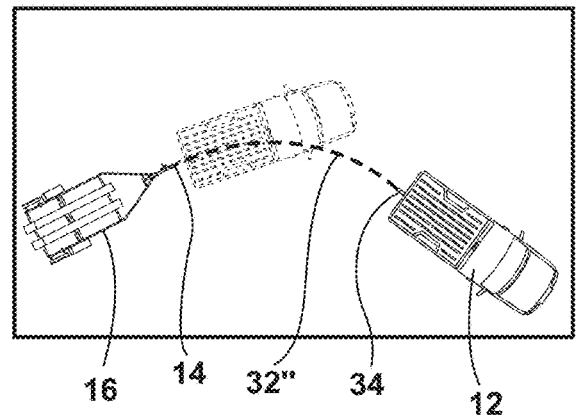
FIG. 18A  FIG. 18B
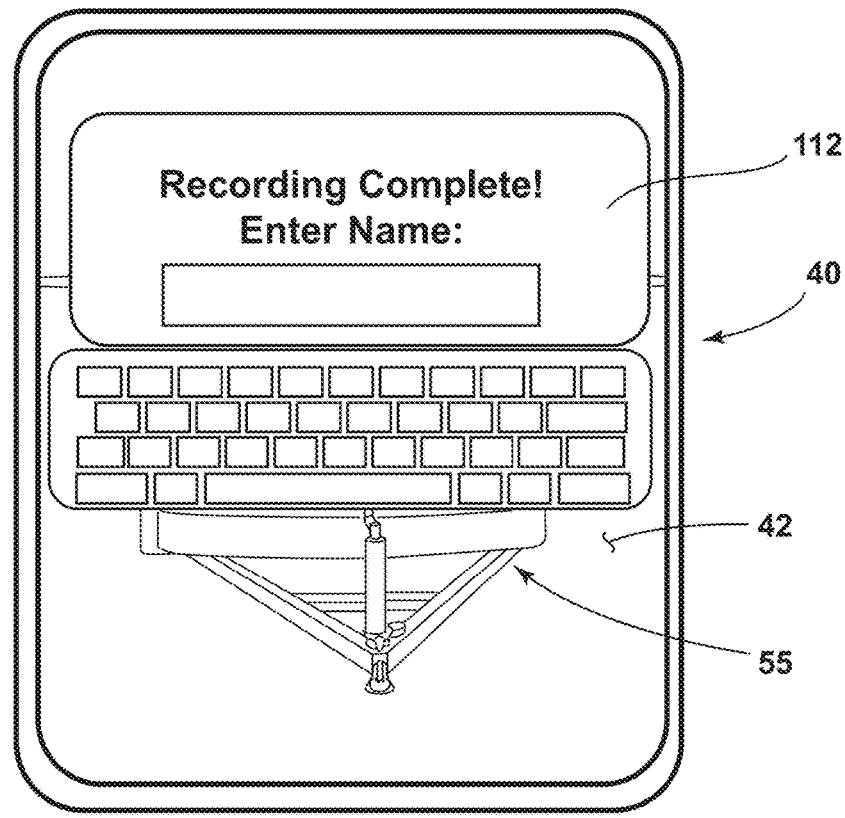
FIG. 19

TRAILER GPS LOCATION STORAGE AND RECALL FOR HITCH ASSIST OPERATION

FIELD OF THE INVENTION

The present invention generally relates to a vehicle hitch assistance system. In particular, the system uses external or stored data to derive an initial alignment path to control the vehicle for in a portion of an automated hitching maneuver.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes a vehicle steering system, a detection system outputting a signal including scene data of an area to a rear of the vehicle, and a controller that controls the vehicle steering system to maneuver the vehicle according to an initial alignment maneuver that positions the vehicle relative to the trailer, such that the trailer is within the area to the rear of the vehicle. The controller further receives the scene data and identifies the trailer within the area to the rear of the vehicle, derives a backing path to align a hitch ball mounted on the vehicle to a coupler of the trailer, and controls the vehicle steering system to maneuver the vehicle including reversing along the backing path.

Embodiments of the first aspect of the invention can include any one or a combination of the following features:

the initial alignment maneuver is derived using data that is obtained from one of an external source or memory associated with the controller;

the initial alignment maneuver is derived using image data received from a remote camera in wireless communication with the controller;

the system further includes a wireless communication module communicatively connected with the controller, and the initial alignment maneuver includes determining a preliminary trailer position using data received from the remote camera via the wireless communication module;

the initial alignment maneuver is further derived using location and heading data of the remote camera stored in memory associated with the controller;

the initial alignment maneuver is determined by retrieving a stored location of the trailer from memory and comparing a position of the vehicle with the stored location of the trailer;

a location of the trailer is stored in memory associated with the controller as the stored location of the trailer upon the controller detecting that the trailer is initially uncoupled from the vehicle;

the initial alignment maneuver is based on a predetermined maneuver stored in memory associated with the controller;

the predetermined maneuver is stored in memory during an alignment maneuver recording process wherein the controller tracks a user-controlled backing maneuver of the vehicle;

the system further includes a GPS module, and the controller tracks the user-controlled backing maneuver using information received from the GPS module and a steering angle sensor included in the vehicle steering system; and the controller derives the initial alignment maneuver by adjusting the predetermined maneuver stored in memory according to a current detected position of the vehicle.

According to another aspect of the present disclosure, a system for assisting in aligning a vehicle for hitching with a trailer includes a vehicle steering system, a detection system outputting a signal including scene data of an area to a rear of the vehicle, and a controller controlling the vehicle steering system to maneuver the vehicle according to an initial alignment maneuver derived from stored data retrieved in memory associated with the controller. The initial alignment maneuver positions the vehicle relative to the trailer, such that the trailer is within the area to the rear of the vehicle. The controller further receives the scene data and identifies the trailer within the area to the rear of the vehicle, derives a backing path to align a hitch ball mounted on the vehicle to a coupler of the trailer, and controls the vehicle steering system to maneuver the vehicle including reversing along the backing path.

According to another aspect of the present disclosure, a system for assisting in aligning a vehicle for hitching with a trailer includes a vehicle steering system, a detection system outputting a signal including scene data of an area to a rear of the vehicle, a remote camera wirelessly transmitting image data, and a controller that receives the image data from the remote camera and controls the vehicle steering system to maneuver the vehicle according to an initial alignment maneuver derived using the image data from the remote camera. The initial alignment maneuver positions the vehicle relative to the trailer such that the trailer is within the area to the rear of the vehicle. The controller further receives the scene data and identifies the trailer within the area to the rear of the vehicle, derives a backing path to align a hitch ball mounted on the vehicle to a coupler of the trailer, and controls the vehicle steering system to maneuver the vehicle including reversing along the backing path.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIGS. 18A and 18B are schematic depictions of a system adjustment for a realignment attempt in a recorded path;

FIG. 19 is a depiction of a message presentable by the system to a user allowing the user to name the recorded path for storage in system memory;

DETAILED DESCRIPTION OF THE PREFERRED EMBODIMENTS

Figure 1:
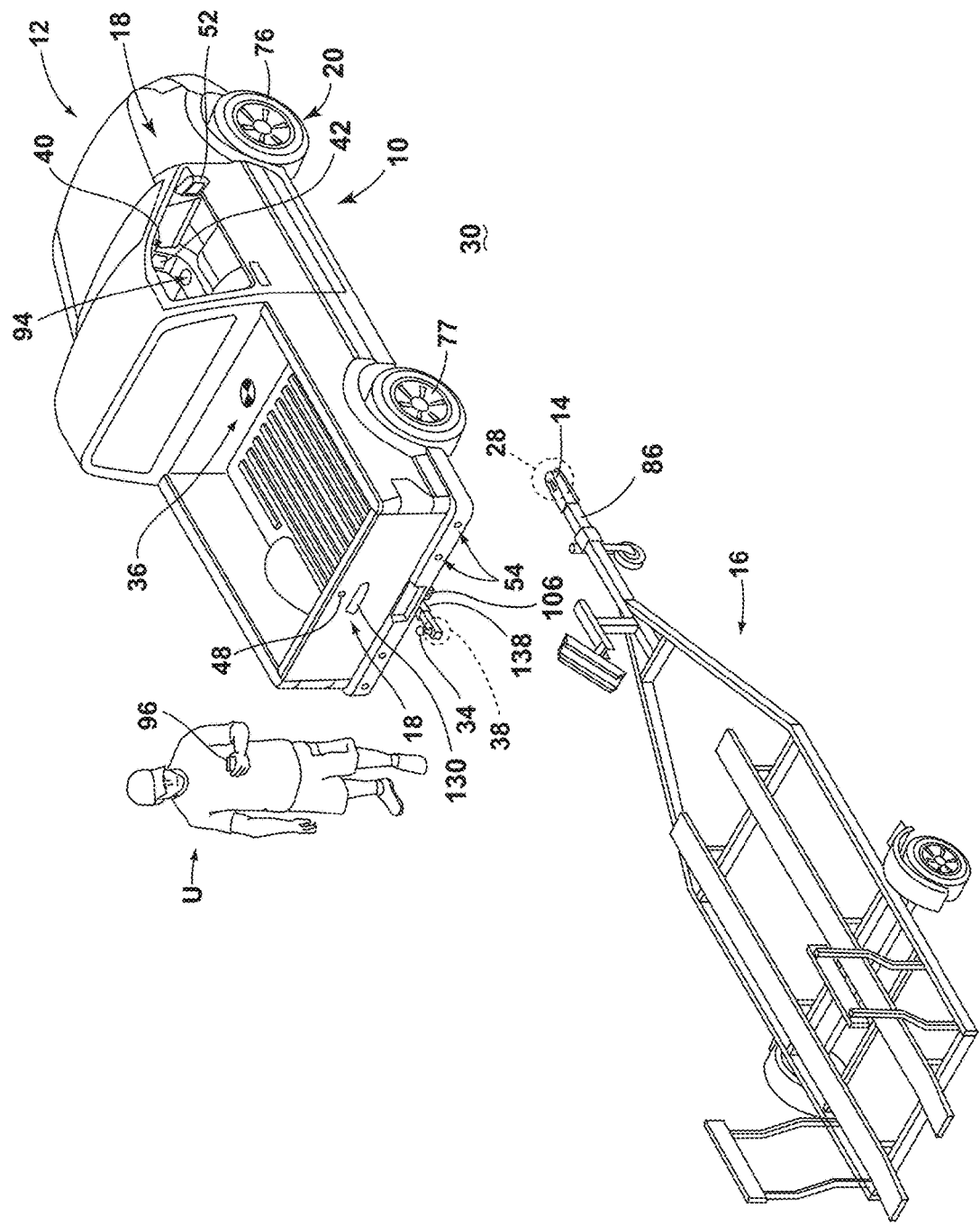
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a vehicle steering system 20, a detection system 104 outputting a signal including scene data 55 of an area to a rear of the vehicle 12, and a controller 26 that controls the vehicle steering system 20 to maneuver the vehicle 12 according to an initial alignment maneuver that positions the vehicle 12 relative to the trailer 16, such that the trailer 16 is within the area 45 to the rear of the vehicle 12. The controller 26 further receives the scene data 55 and identifies the trailer 16 within the area 45 to the rear of the vehicle 12, derives a backing path 32 to align a hitch ball 34 mounted on the vehicle 12 to a coupler 14 of the trailer 16, and controls the vehicle steering system 20 to maneuver the vehicle 12 including reversing along the backing path 32.

Figure 2:
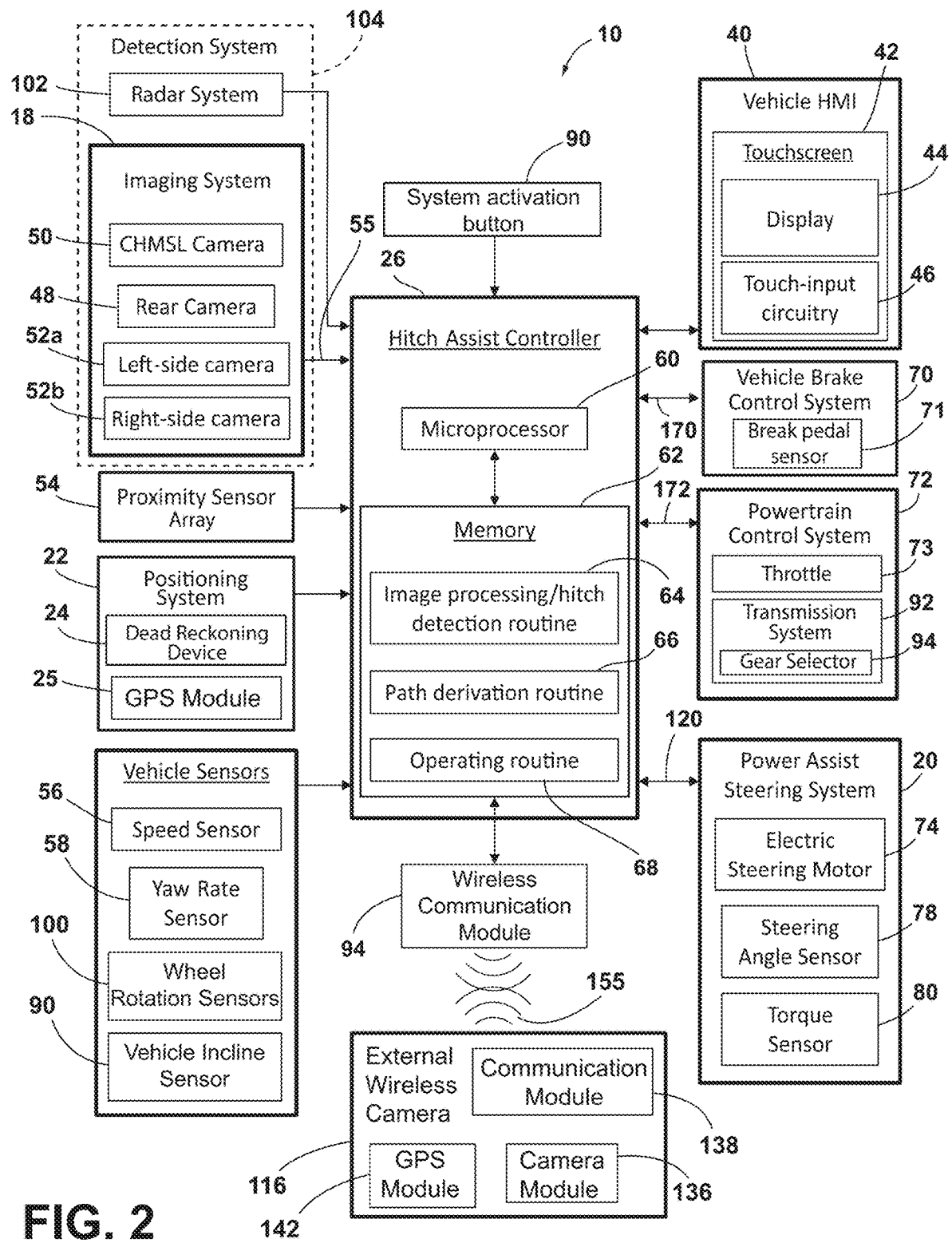
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
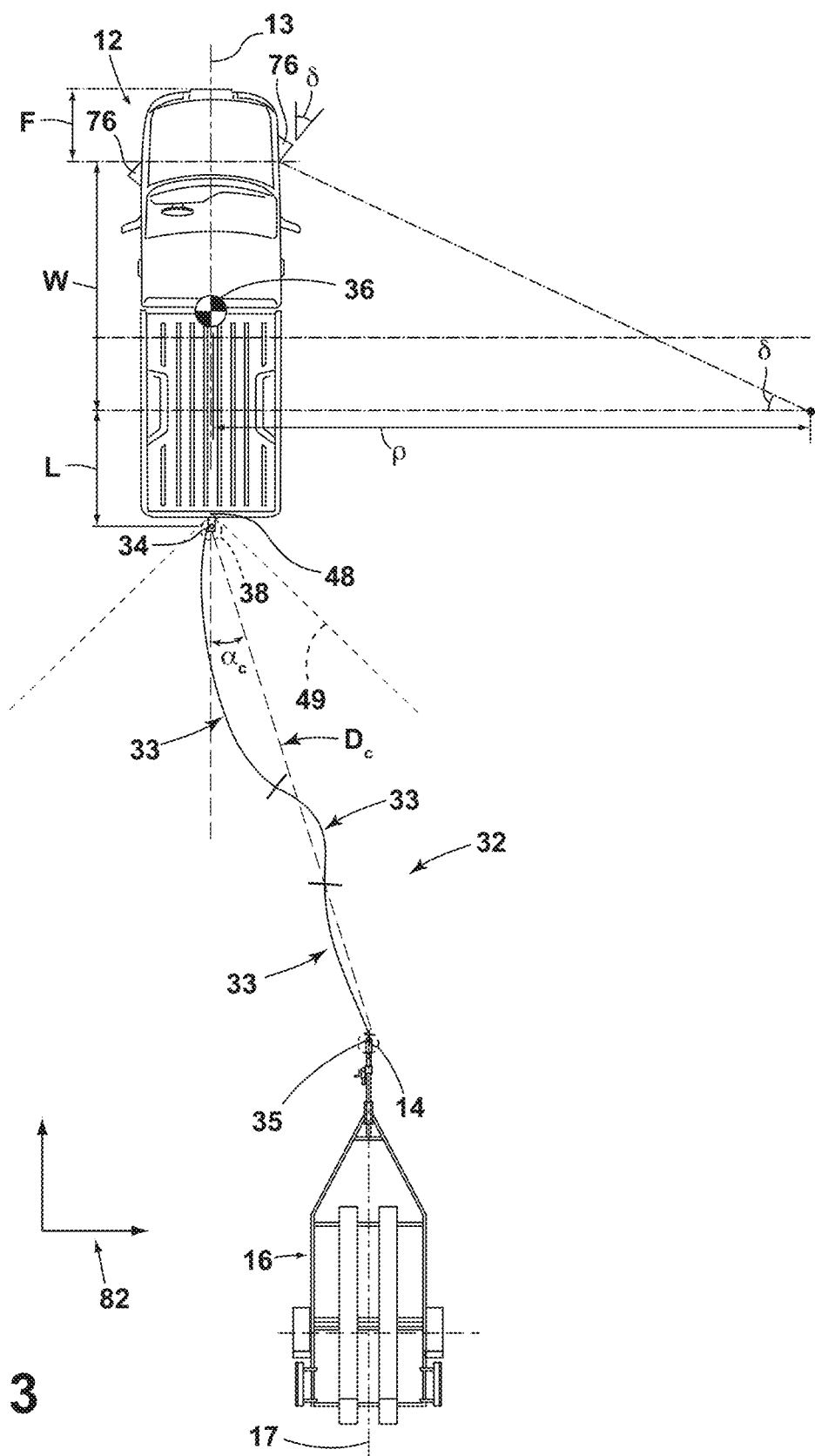
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions, to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for unintended contact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated unintended contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent unintended contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like, can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example, such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein may generally be used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16, such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintended contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius prim, to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. Pat. No. 9,821,845 and U.S. Patent Application Publication No 2020/0023695, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20 as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such as a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
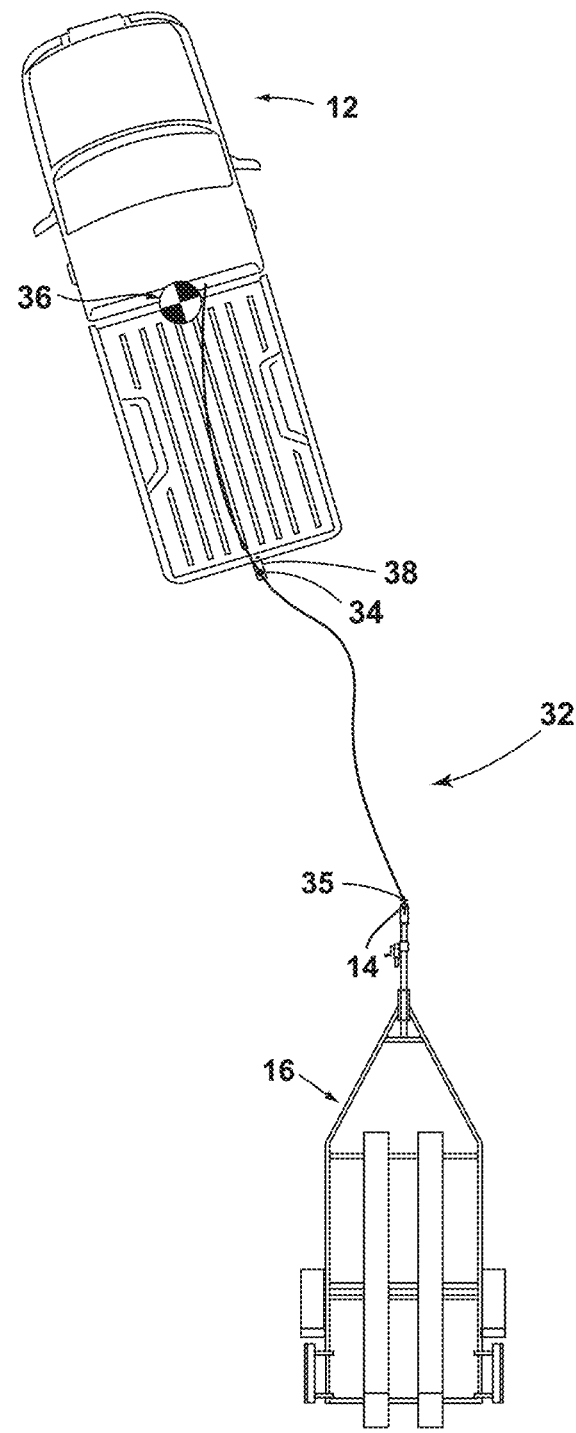
FIG. 4 is an overhead schematic view of the vehicle during a subsequent step of the alignment sequence with the trailer.
Figure 5:
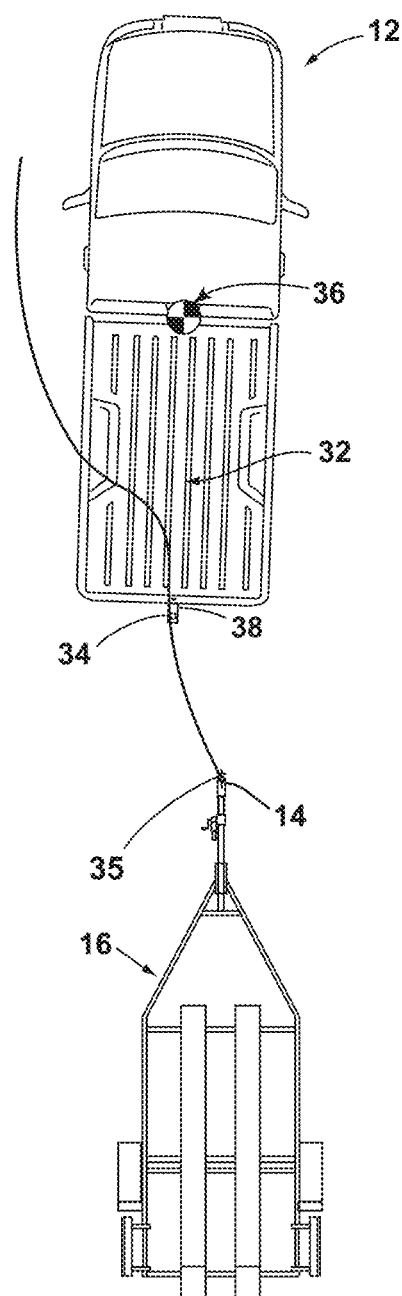
FIG. 5 is an overhead schematic view of the vehicle during a subsequent step of the alignment sequence with the trailer.
Figure 6:
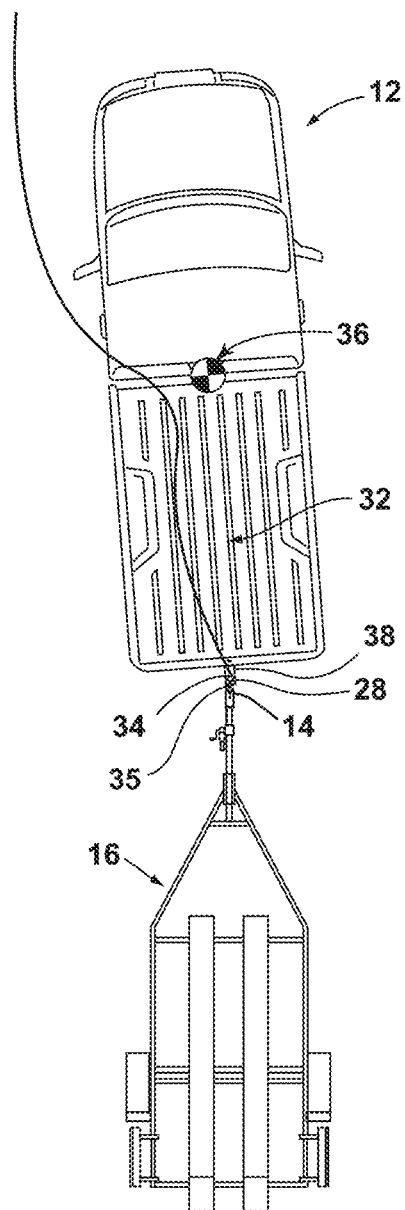
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $α_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data 55), including as vehicle 12 moves closer to trailer 16, as shown in FIGS. 4 and 5. Still further, the coupler 14 can be assumed to be static, such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired position 38d thereof relative to the tracked position 28 of coupler 14, as discussed above and shown in FIG. 6.

As mentioned above, the "longitudinal control" in an assisted hitching maneuver is the portion of vehicle 12 movement along path 32 controlled by the vehicle powertrain control system 72 and the vehicle brake system 70 with the "lateral control" being the portion controlled by the power assist steering system 20. It is to be understood that the lateral control requires movement of the vehicle, such that the two control schemes operate together to move vehicle 12 along the path 32. In this respect, the later alignment of the path 32 with the coupler 14 is dictated by the lateral control (i.e., by the steering system 20), and the final stopping point of vehicle 12 along path 32 is dictated by the longitudinal control. Accordingly, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user but can simply be lowered onto hitch ball 34. In one implementation of system 10, the accuracy in final longitudinal alignment of hitch ball 34 with coupler 14 can be to within 1 cm of a completely aligned position (center-to-center). Controller 26 can receive feedback data during vehicle 12 movement regarding measured vehicle speed and localization (by way of speed sensor 56 and positioning system 22, respectively), such that controller 26 can apply brake pressure and reduce engine speed to bring the vehicle 12 to a standstill at the final target position with hitch ball 32 at endpoint 35.

Figure 7:
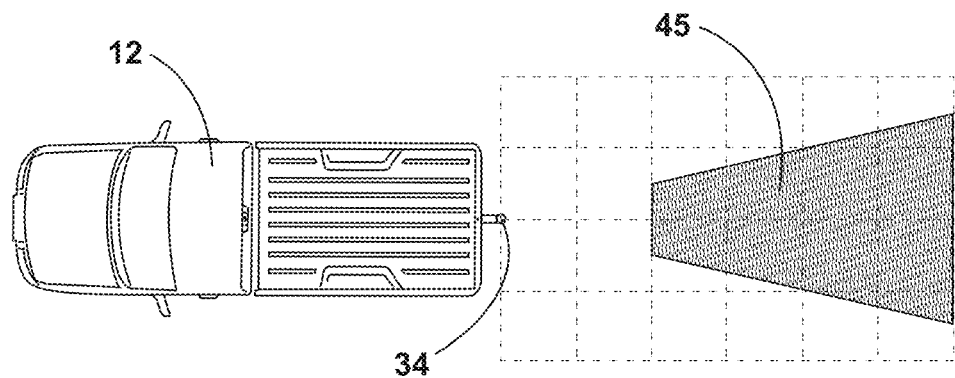
FIG. 7 is a schematic depiction of a target area for positioning of a trailer relative to a vehicle for completion of an automated hitching maneuver.

As can be appreciated, the system 10, operating as described above, controls vehicle 12 to align the hitch ball 34 with the coupler 14 of trailer 16 in a narrowly defined scenario. In particular, as illustrated in FIG. 7, the described system 10 operation includes requiring the driver to first maneuver the vehicle 12 such that it is, in one example, roughly two to six meters in front of the coupler 14 and such that both the vehicle 12 and the trailer 16 have a similar heading angle. In this aspect, system 10 may require that the coupler 14 of the trailer 16 be within a particular target zone 45 with respect to vehicle 12. In various examples, the target zone 45 can be derived according to the maximum steering angle $δ_{max}$ of the steered wheels 76, the accuracy of the tracking capability of imaging system 18 and the associated image processing routine 64, and additional tolerance factors. Generally speaking, system 10 is configured to only execute operating routine 68 to align hitch ball 34 with the coupler 14 by backing along path 32 when coupler 14 is initially positioned within the target area 45. Once vehicle 12 is located for such positioning with respect to trailer 16, the user may provide a continuous input to a "keep-alive" button 90 to indicate that the reversing maneuver is desired. System 10, by way of controller 26, controls the transmission system 92, powertrain throttle 73, steering system 20, and brake system 70. The system 10, utilizing such control, executes a low speed, reverse vehicle 12 motion to align the hitch ball 34 to the coupler 14.

Figure 8:
FIG. 8 is a schematic depiction of an initial alignment path generated using stored or external data and useable in moving the vehicle toward the trailer.
Figure 8:
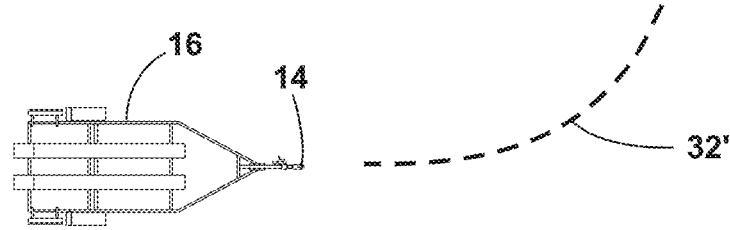
Figure 8:
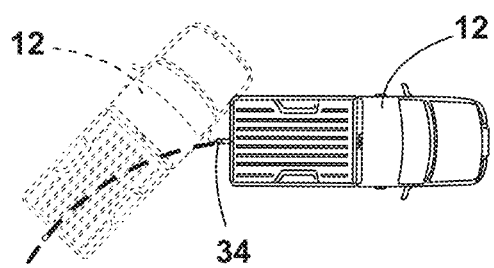
Figure 9:
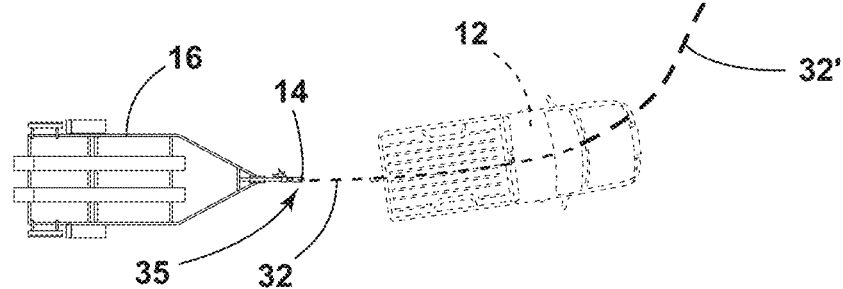
FIG. 9 is a schematic depiction of a final alignment path derived using vehicle camera data for final alignment of the vehicle for hitching with the trailer.

As shown in FIGS. 8 and 9, to expand the usability of system 10 to scenarios where trailer 16 is initially outside of target area 45, system 10 can utilize various forms of stored or external data for use by controller 26 in deriving an initial alignment path 32' (FIG. 8) that can be input to operating routine 68 to generate steering and braking controls to reverse vehicle 12 toward trailer 16 such that coupler 14 will enter the target area 45. At such a point, controller can use the image processing 64 and path 66 routines to derive path 32 (FIG. 9), as discussed above, for final alignment of hitch ball 34 with coupler 14.

Figure 10:
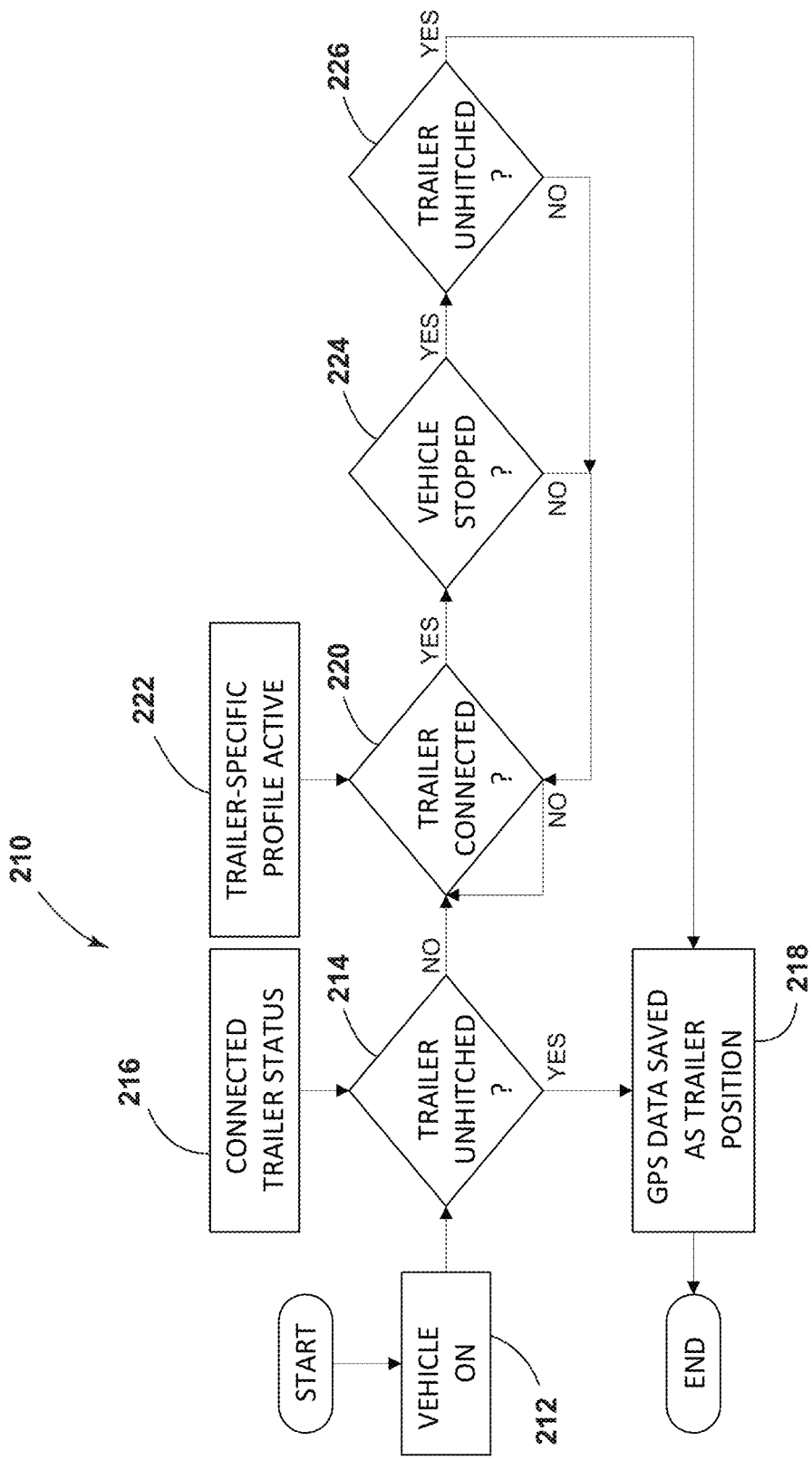
FIG. 10 is a flowchart depicting a method for determining a disconnected trailer status and storing a position thereof in vehicle memory.
Figure 11:
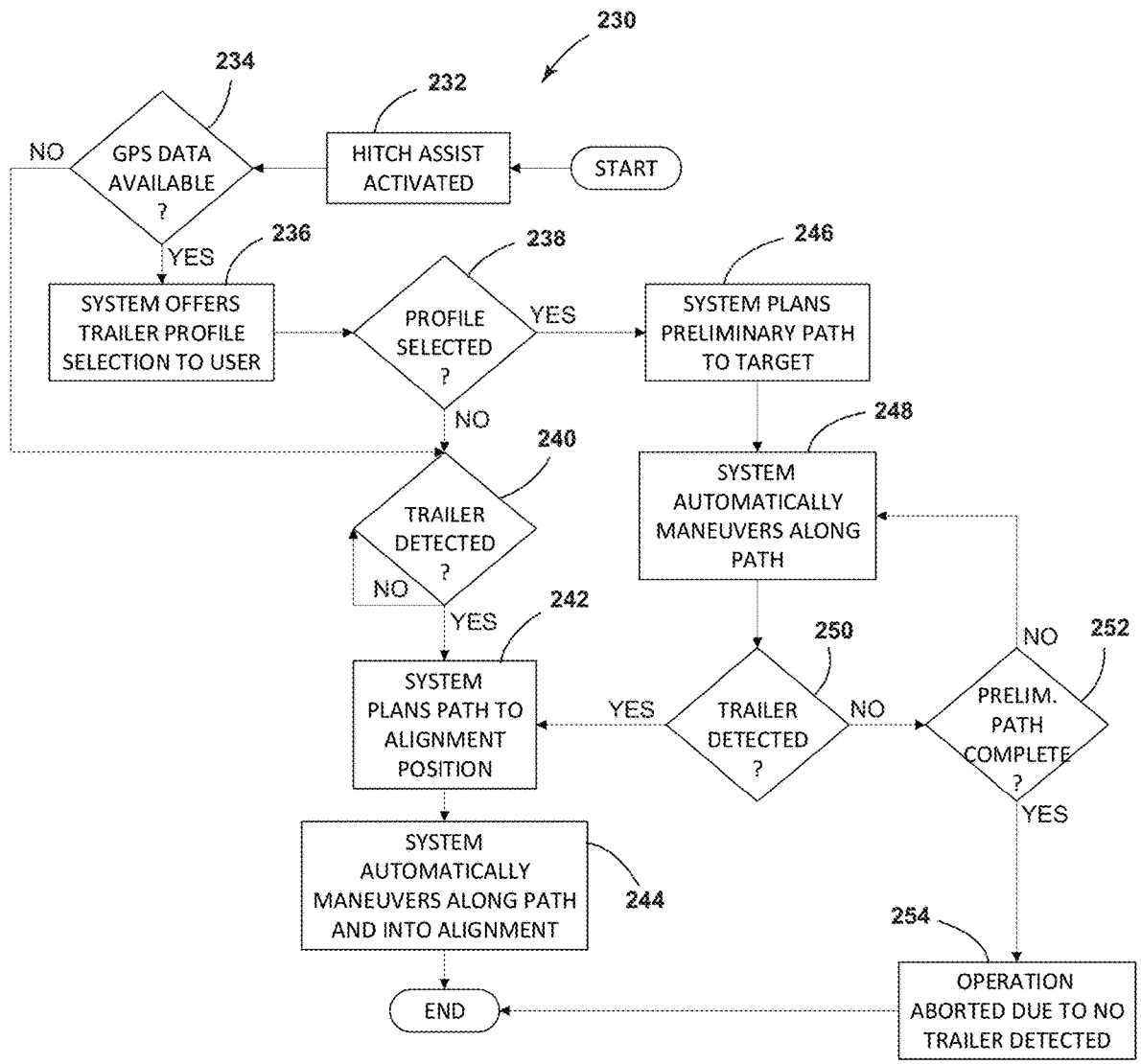
FIG. 11 is a flowchart depicting a method for using a stored trailer position in aligning the vehicle with the trailer.
Figure 12:
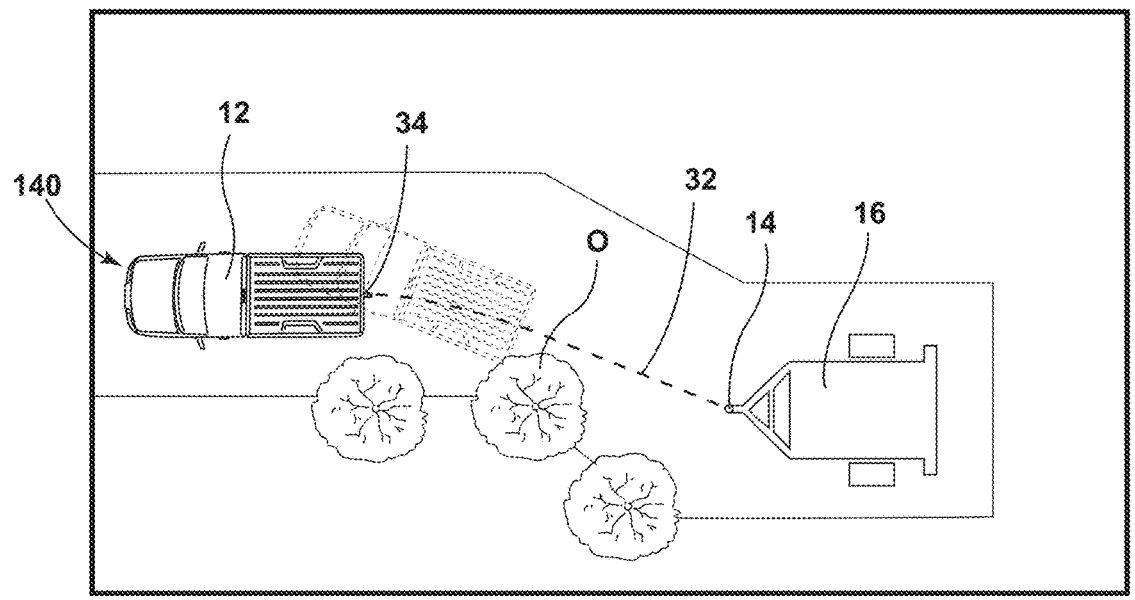
FIG. 12 is a schematic depiction of a setting in which a pre-recorded backing path can be used to navigate a vehicle toward a trailer.
Figure 13:
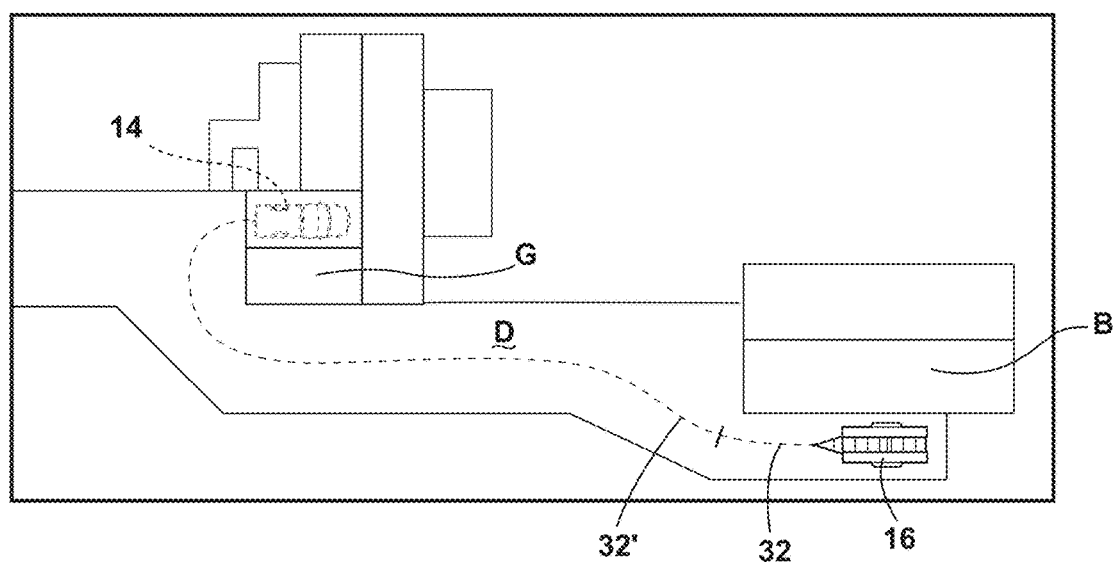
FIG. 13 is a further schematic depiction of a further setting in which a pre-recorded backing path can be used to navigate a vehicle toward a trailer.
Figure 14:
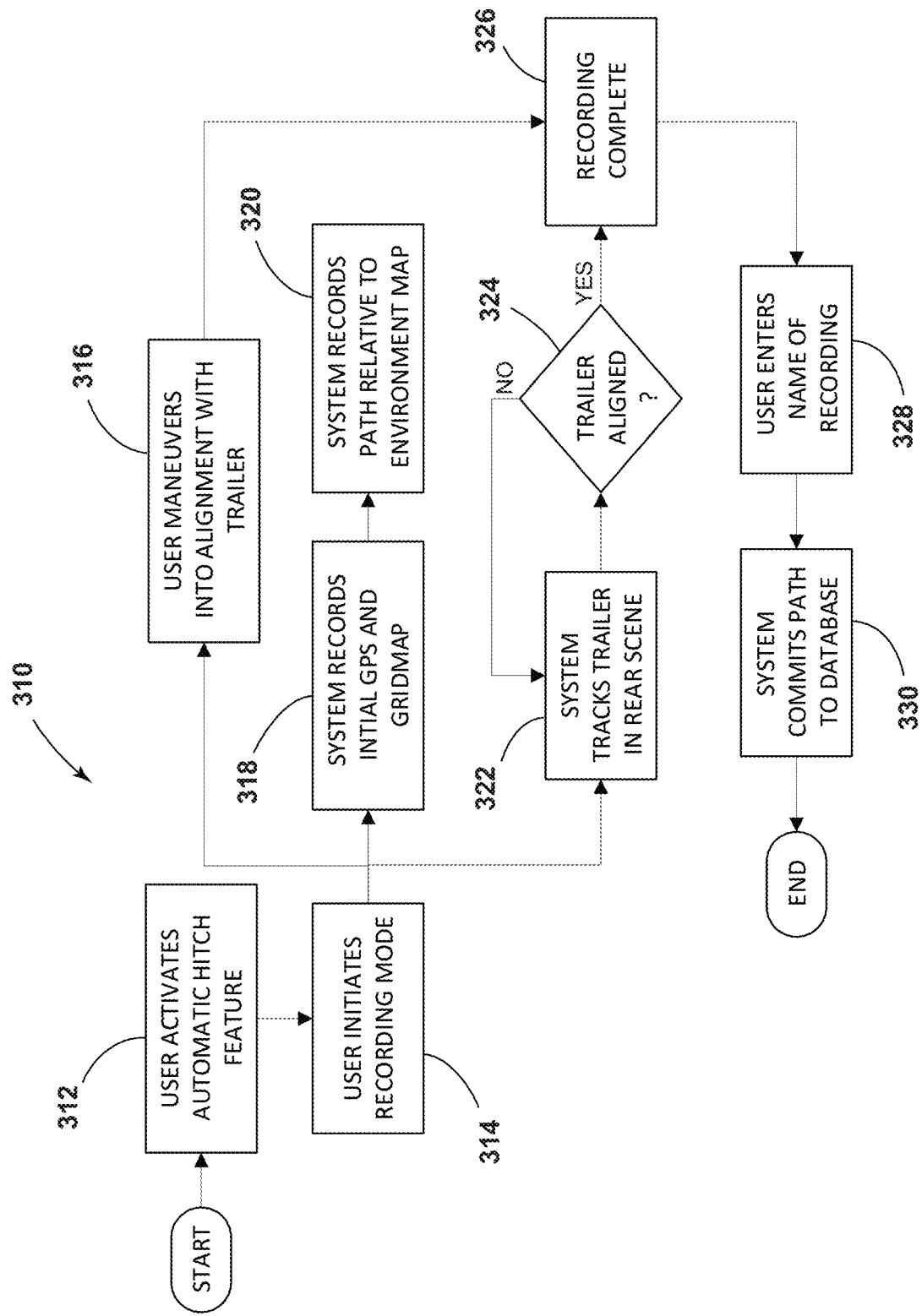
FIG. 14 is a flowchart depicting a method for recording an initial alignment path to a trailer.

Turning to FIGS. 10 and 11, in one implementation, system 10 may utilize stored data regarding a location of trailer 16 to derive the initial alignment path 32'. According to the above, the use of the initial alignment path 32', derived accordingly, can allow for execution of an automated hitching maneuver from a position where trailer 16 is not initially within the line of sight of the vehicle 12 cameras 48, 50, 52a, 52b and/or when a typical path obtained from path derivation routine 66 may be obstructed or otherwise non-ideal (such as coupler 14 being out of the target area 45 or any one of various ambient or environmental conditions impacting the ability of controller 26 in identifying trailer 16). In one implementation, system 10 can be configured to store or otherwise track the location of multiple trailers 16 associated with vehicle 12 using the method 210 shown in FIG. 10. In general, the method 210 involves storing a particular trailer 16 location, including through user interaction (e.g. the user can manually save the location) or by interpreting the location based on vehicle 12 behavior during a drive cycle. For example, if the vehicle 12 is towing trailer 16 and system 10 detects that the trailer 16 is subsequently disconnected, system 10 can assume the trailer 16 has been unhitched and left in the position at which the unhitching is detected. System 10 can then save that trailer 16 location in memory 62 for recall in a later hitching operation.

More particularly, the method 210 begins when vehicle 10 is in an "on" state (e.g., with the general vehicle systems activated and/or with the engine running) in step 212. When vehicle 12 enters such a state, controller 26 can initially check to see if a trailer 16 has been uncoupled from vehicle 12 (i.e., unhitched) since the vehicle 12 was last turned off (step 214). To do this, system 10 can, in one example, evaluate the state of the trailer electrical connector 106 on the vehicle 12. In a further aspect, controller 26 may be configured to fuse multiple detection methods (including using image data 55 and/or data from detection system 54) to more accurately determine if a trailer 16 is connected. If the status changes from "trailer connected" to "no trailer connected" (i.e. the electrical connection 106 is unplugged), system 10 determines that no trailer 16 is connected with vehicle 12. To determine that a trailer 16 has been disconnected from vehicle 12 since it was last in an "on" state, system 10 compares the state detected in step 214 with the last known state 216 regarding trailer connection, which may be stored in memory 62. If the state 216 has changed from "connected" to "disconnected," system 10 can infer that a trailer 16 has been disconnected from vehicle 12, which is often done when the vehicle is turned off.

If, in step 214, it is determined that a trailer 16 has become unhitched, controller 26 can access the data from the positioning system 22, particularly GPS module 25, to save the current GPS location of the vehicle to memory 62 (step 218). As can be appreciated, the vehicle location can be saved in memory 62 as corresponding with the "location" of the trailer 16, as the location of the vehicle corresponds with the positioning of vehicle 12 for a subsequent hitching operation associated with the trailer 16. Additionally, the trailer state information 216 can include information regarding the specific trailer connected with vehicle 12. In one example, system 10 can maintain a database of trailer profiles with information regarding specific trailers 16 owned by the vehicle 12 owner and/or typically used with vehicle 12. This information can include trailer-specific information (the type of trailer, the type of coupler 14, and the relevant trailer dimensions), as well as a user-selected name of the trailer. In this manner, the trailer state information 216 can indicate a particular profile with the attached trailer 16 by controller 26 identifying the trailer 16 based on known characteristics (an electrical profile at outlet 106, image processing based on comparison with an image in memory 62, etc.) or a user indication/selection from stored trailer profiles. By associating a trailer profile with the trailer state 216, controller 26 can associate the stored location of a disconnected trailer with the profile identified in the state information 216.

In addition to the GPS-based trailer 16 location, system 10 can also store in memory 62 a "pose" of the vehicle relative to or around the GPS coordinates of the vehicle-based trailer 16 location. The pose can be expressed as a vehicle 12 heading 33 angle between 0°-360°, with 0° being due-North. This pose can be used in future hitching operations based on the stored trailer 16 location, as an input to the path derivation routine 66, which can be used to determine the initial alignment path 32' by including an expected approach direction in the process/algorithm used to derive the initial alignment path 32'. This can allow the initial alignment path 32 to, in effect, account for any other objects (including other trailers) in the area of the subject trailer 16.

If, in step 214, it is determined that a trailer 16 was not unhitched since the instance of vehicle 12 being turned on, controller 26 can continue to monitor system 10 to determine if a trailer 16 is subsequently connected (step 220). As is done in step 214, controller 26 can similarly monitor the status of the electrical connector 106. If the coupling of a trailer connection with the electrical connector 106 indicates that a trailer 16 has been connected, such connection is determined in step 220. If a trailer 16 is not connected, controller 26 continuously monitors system 10 to become aware once a trailer 16 becomes connected. Once controller 26 determines that a trailer 16 has become connected, controller 26 can associates the connected trailer state 222 with the particular profile corresponding with the connected trailer 16 (similar to association thereof with the trailer state 216 discussed above). With a trailer 16 connected, controller 26 monitors for the trailer 16 to become unhitched from vehicle 12. In one aspect, controller 26 can monitor for disconnection of trailer 16 when the vehicle 12 is stopped. If the connected trailer status 222 changes with the vehicle 12 in motion, controller 26 may disregard the indication as in error. Additional preconditions to a disconnected trailer 16 determination may also be imposed, including requiring that vehicle 12 powertrain 72 be in park or that vehicle 12 be at a standstill for longer than a time threshold. If the preconditions from step 224 are met, controller 26 monitors system 10 to determine if the connected trailer status 222 changes (step 226). If controller 26 detects a condition indicating that a previously-connected trailer 16 has been disconnected, the trailer is considered to be unhitched, and controller 26 saves the GPS location at the time of disconnection to memory 62, such as within the profile associated with trailer 16.

Turning now to FIG. 11, controller 26 can use the stored GPS information (including both location coordinates and vehicle 12 pose) in connection with path derivation routine 66 to derive the above-described initial alignment path 32' from an initial position of vehicle 12 toward the saved location of the trailer 16. Controller 26 can then control the vehicle 12 to follow that path 32' back toward the general location of the trailer 16. More specifically, when the user initiates an automated hitching maneuver (step 232), controller 26 can check to see if location data is associated with any of the stored trailer 16 profiles in memory 62 (step 234). If such information is available, controller 26 can offer such trailer profiles as selectable options for the subject of the desired backing maneuver (which may be done via a specific menu on HMI 40) in step 236. When presented, the user can select such a profile or select to proceed with visual trailer 16 detection to hitch with a trailer believed to be within the target area 45 (or that can be easily positioned within the target area 45 by user-controlled movement of vehicle 12). If no stored position profile is selected in step 240, controller 26 proceeds with an automated hitching maneuver as discussed above with respect to FIGS. 1-7, in which controller 26 uses image processing routine 64 to detect a trailer 16 within target area 45 (step 240). If such a trailer 16 is detected, controller 26 runs the path derivation routine 66 (step 242) using the detected trailer 16 and/or coupler 14 location (depending on the specific implementation of system 10 and the visibility of such features). Controller 26 then executes operating routine 68 to move vehicle 12 along the derived path 32' to align the hitch ball 34 with coupler 14 (step 244).

If, in step 238, the user selects a trailer 16 profile with available location information, controller 26 can use path derivation routine 66 to generate the initial alignment path 32' to position vehicle 12 within, for example, a predetermined distance from the stored location associated with the selected trailer 16 profile (step 246). Controller 26 can then control the vehicle 12 to complete the initial alignment maneuver by driving vehicle 12 to the initial alignment path 32' (step 248) with the goal of positioning vehicle 12 relative to the selected trailer 16, such that the trailer 16 is within target area 45 to the rear of the vehicle 12 and such that trailer 16 and/or coupler 14 can be identified in the image data 55 (step 250). Once trailer 16 is identified within the target area 45, controller 26 can use the standard path derivation routine 66 (step 242) and operating routine 68 to back vehicle 12 toward trailer 16 for alignment of hitch ball 34 with coupler 14 according to the processes described above (step 244). As discussed above, the initial alignment path 32' can be derived to end short of the stored trailer 16 location to allow for enough room to effectively restart operating routine 68 upon trailer 16 detection and to allow a sufficient stopping distance between vehicle 12 and trailer 16 should the image processing routine 64 be unable to locate trailer 16, at which point, the operation may end (step 254). This functionality removes the need for the driver to pre-align the vehicle 12 in front of the trailer 16 before beginning an automated hitching operation. This functionality may also allow for use of system 10 to back vehicle 12 to a trailer 16 with a stored location in conditions where diminished detection of trailer 16 from image data 55 (e.g. low light or obstructed view from, for example, snow, rain, or other weather conditions) would impact the usability of system 10, as described above.

Further functionality according to the use of stored trailer 16 locations is described with respect to FIGS. 12-22. In particular, controller 26 can additionally store a predetermined maneuver in the form of a preliminary alignment path 32' in memory 62 associated with a trailer 16 in a stored location in an alignment maneuver recording process. In particular, controller 26 can provide a process for the user to pre-record a user-controlled backing maneuver and store it in memory 62 as an initial alignment path 32' to be associated with a particular trailer 16 in a particular location. In one aspect, the location may be associated with a location in which trailer 16 is typically stored, such that the preliminary alignment path 34' does not have to be re-recorded with each hitching and subsequent un-hitching of trailer 16 from vehicle 12. According to the examples of FIGS. 12 and 13, a user may typically park a trailer 16 in a position where a typical path 32 may move vehicle 12 toward an object O (FIG. 12) and/or where trailer 16 is not within the field of view of any cameras 48, 50, 52a, 52b, such as adjacent an outbuilding B with vehicle 12 being driven along driveway D to a garage G in which vehicle 12 is parked. If the driver wishes to be able to have vehicle 12 automatically moved into a position for hitching with trailer 16, the user can "record" the desired path 32' to align vehicle 12 with trailer 16 (at least to a position where trailer 16 is within target area 45), as discussed further below. Notably, such a path 32' can account for a desired heading 33 of vehicle 12 relative to trailer 16 upon completion of the maneuver. When a subsequent use of trailer 16 is desired, the user can initiate the desired hitching process and may select the trailer 16 using, for example, an image captured from image data 55 during the recording process. Once confirmed, the user can select to initiate the hitching process and then controller 26 can drive vehicle 12 along an initial portion of path 32' (which may include both forward and backward driving) to move vehicle 12 out of the garage G and along the driveway D to a position where the standard automated hitching maneuver can successfully align the hitch ball 34 with the coupler 14 of trailer 16. In one aspect, the particular preliminary alignment path 32' can be recorded during reversing of vehicle 12 under the control of user. Alternatively, the path 32' can be based on driving of vehicle 12 away from trailer 16 when the location thereof was stored in memory (62 and/or 98) and adjusted to account for known vehicle behavior when reversing. In operation, as vehicle 12 approaches the trailer 16 location, the image processing routine 64 is activated and begins searching for the actual trailer 16. Once trailer 16 is identified, path derivation routine 66 is executed and the hitching maneuver is completed by controller 26 moving vehicle 12 along the generated path portion 32.

Figure 17:
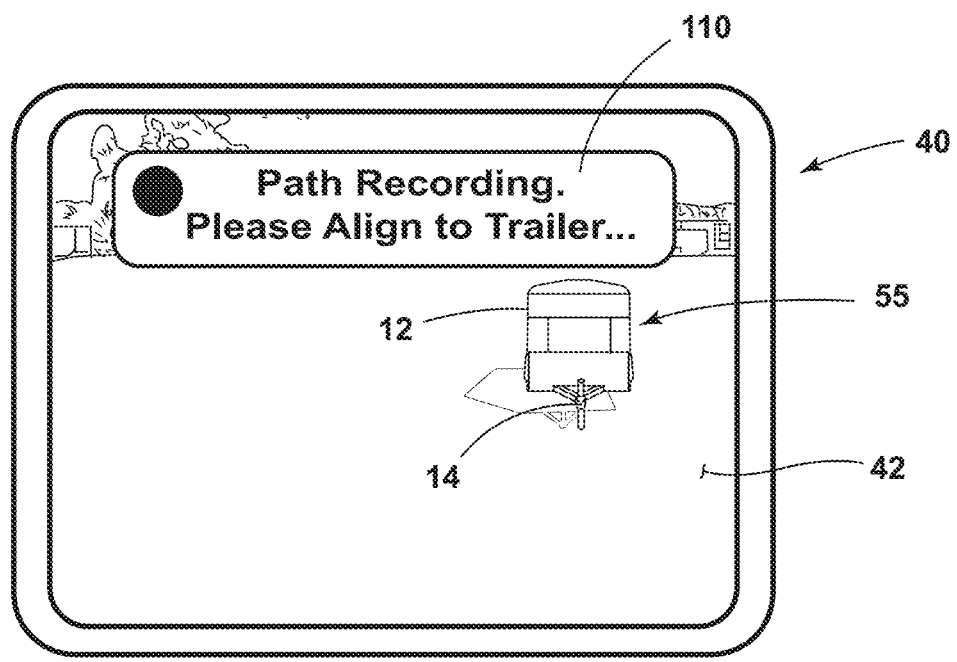
FIG. 17 is a depiction of a message presentable by the system to a user notifying the user that an alignment path is being recorded.
Figure 20:
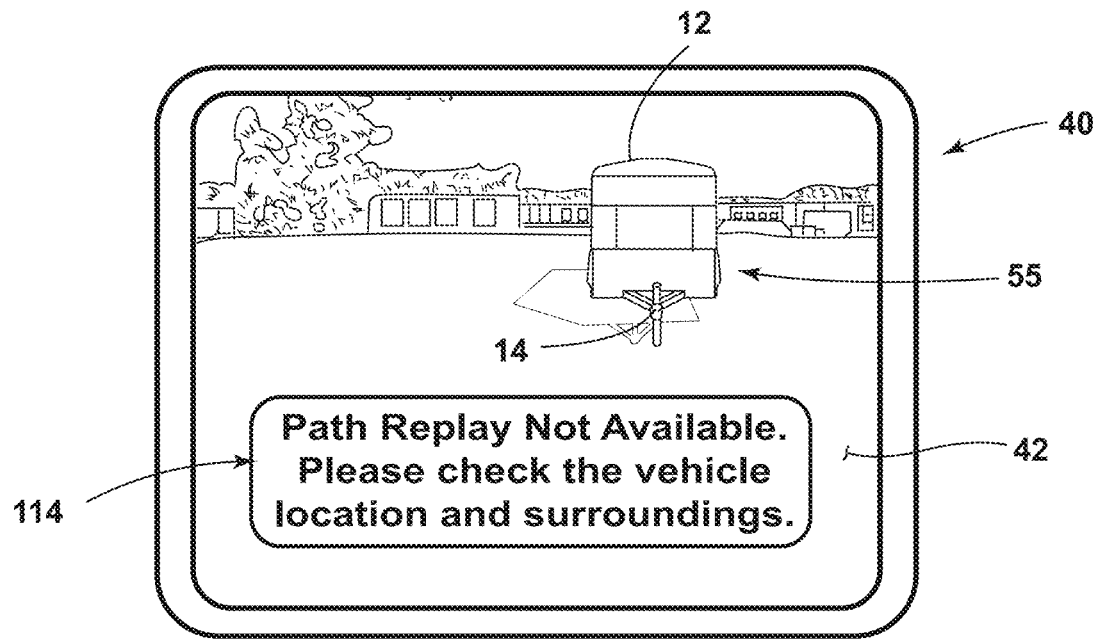
FIG. 20 is a depiction of a message presentable by the system to a user notifying the user that a recorded alignment path cannot be used.
Figure 24A:
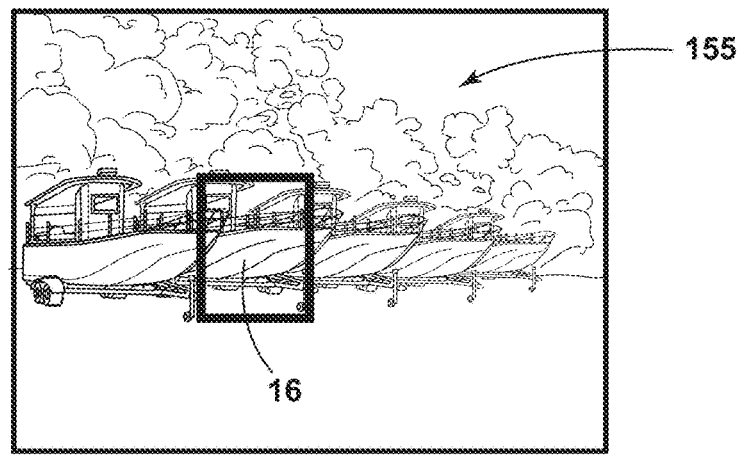
FIGS. 24A and 24B are examples of external image data useable by system.
Figure 24B:
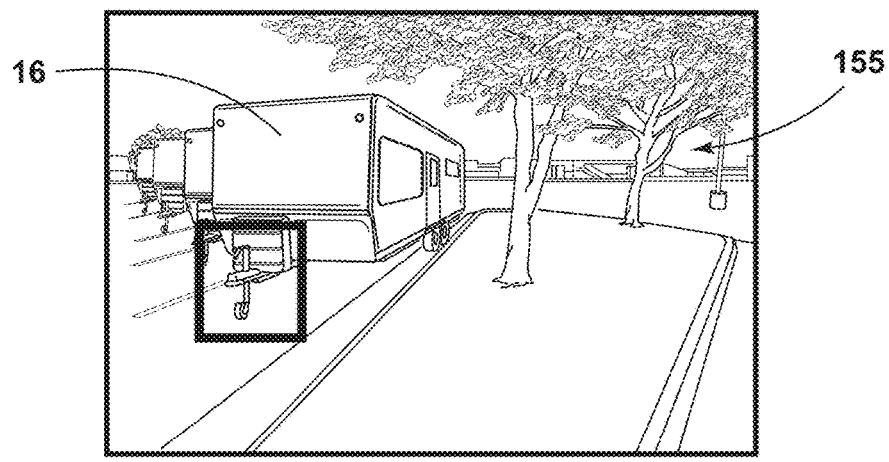
Figure 25:
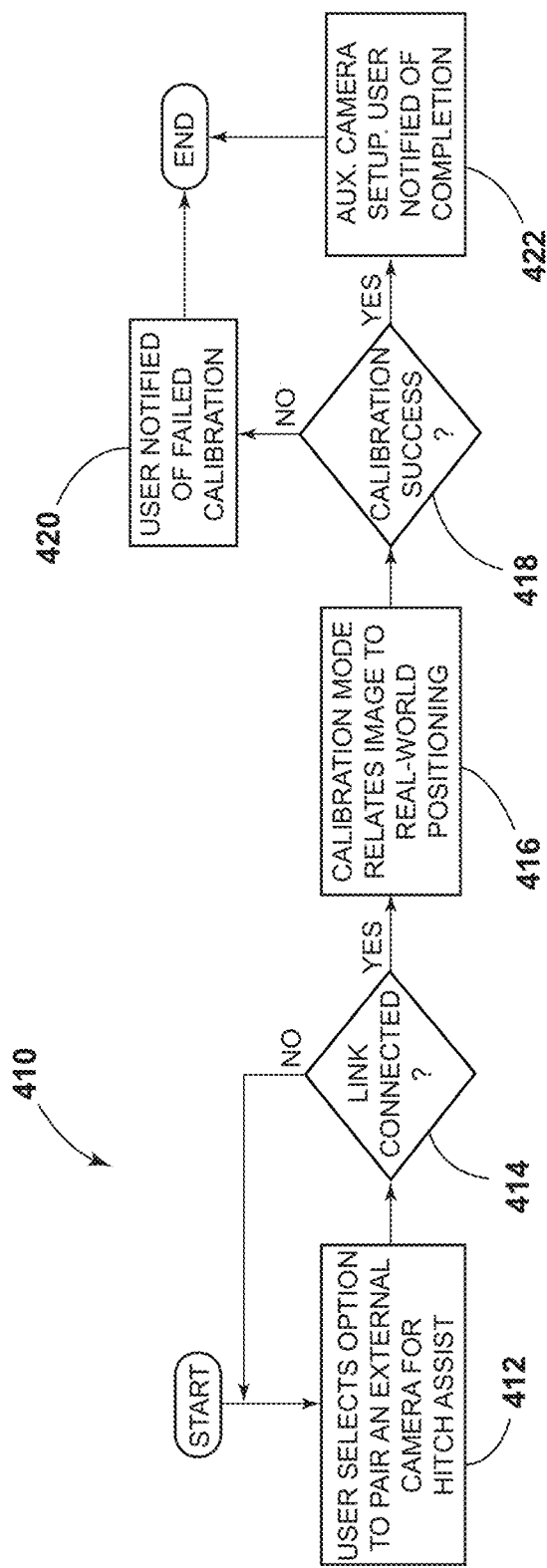
FIG. 25 is a flowchart depicting a method for pairing an external wireless camera with the system.

More specifically, as shown in the flowchart of FIG. 24, a method 310 for recording a preliminary alignment path 32' can begin when the user initializes the automated hitching feature using the vehicle HMI 40 (step 312). Controller 26 can then present a menu 108 on the screen 42 (FIG. 16) associated with HMI 40 that allows the user to initiate a recording mode, such as by soft button 110 or the like, at which point the user is notified, such as by a subsequent HMI 40 message 112 (FIG. 17). Once initiated, controller 26 saves to memory the GPS location of the vehicle 12 at the start of the recording (step 318), with such location being used in future replays of the path, including to verify the vehicle is initially located at approximately the same vehicle position (as the feature may not allow the path to be replayed in a different location). The user then maneuvers the vehicle 12 into alignment with the trailer (step 316). Simultaneously, controller 26 records the vehicle path 32', including based on the steering angle δ, which is measured during recording. The path 32' can further be recorded by capturing discrete waypoints in the GPS data, which can then be fitted to a continuous curvature. Notably, the path 32' may be recorded without considering the vehicle 12 speed, as the system 10 may provide its own speed profile for replay maneuvers (which may be slower than many manual maneuvers). Additionally, the path 32' may be recorded relative to fixed objects O in an environment map (e.g. a radar grid map) surrounding the vehicle 12 (step 320), which may be correlated with the GPS data, including using the dead reckoning device 24. The controller can also use the image processing routine 64 to detect and track the trailer 16 (step 322) to evaluate for alignment of hitch ball 34 with coupler 14 (step 324) to the extent that completion of the maneuver can be inferred (step 326). Once the recording is complete, controller 26 can save the path 32' to memory 62, including in association with the trailer 16 profile. In connection with saving the path 32' in step 330, the user can be given an option to name the path by way of a subsequent message 112 on HMI 40 (FIG. 19).

Notably, the path 32' can be based on generally rough or approximate alignment criteria in step 324, such that the driver does not have to precisely align vehicle 12 to the trailer 16 to produce a "satisfactory" or useable recording. In this respect, it can be appreciated that moving vehicle 12 to position trailer 16 within target zone 45 can allow an actual path 32 to be derived for completion of the hitching routine, as discussed above with respect to FIGS. 8 and 9 and as discussed further below. In this manner, the system 10 will adapt to the actual trailer 16 position in replay attempts. Further, the recording process can be configured to omit "retries" by the user during the manual maneuver (step 316). For example, the driver may roughly align vehicle 12 to the trailer 16 but may do so imprecisely. If the driver wishes to actually hitch the trailer 16 to the vehicle 12 after the manual maneuver, the driver may then drive—forward and backward (including multiple times) until the alignment is satisfactory for hitching, as illustrated in FIG. 18A. In further aspects, the driver may make adjustments to achieve a desired heading 33 of vehicle 12 relative to the trailer 16 for the final position for the recorded path 32'. As such, it may be useful to include or account for direction-change maneuvers in the path recording. In one aspect, such maneuvers along path 32" can be considered as path-relevant maneuvers based on the measured heading 33 of vehicle 12 at an instance of change in driving direction (i.e. whenever the system shifts from D to R, or vice versa). If the relative heading 33 between the trailer 16 and vehicle 12 (determined by a combination of image processing 64 and GPS data) is nearly the same between direction changes (including within a tolerance), the maneuver along path 32" is considered a realignment attempt and is filtered out of the recording. Otherwise, it can be considered relevant to the path recording such that the developed initial alignment path 32' can be adjusted to achieved the final heading 33, as shown in FIG. 18B.

Figure 15:
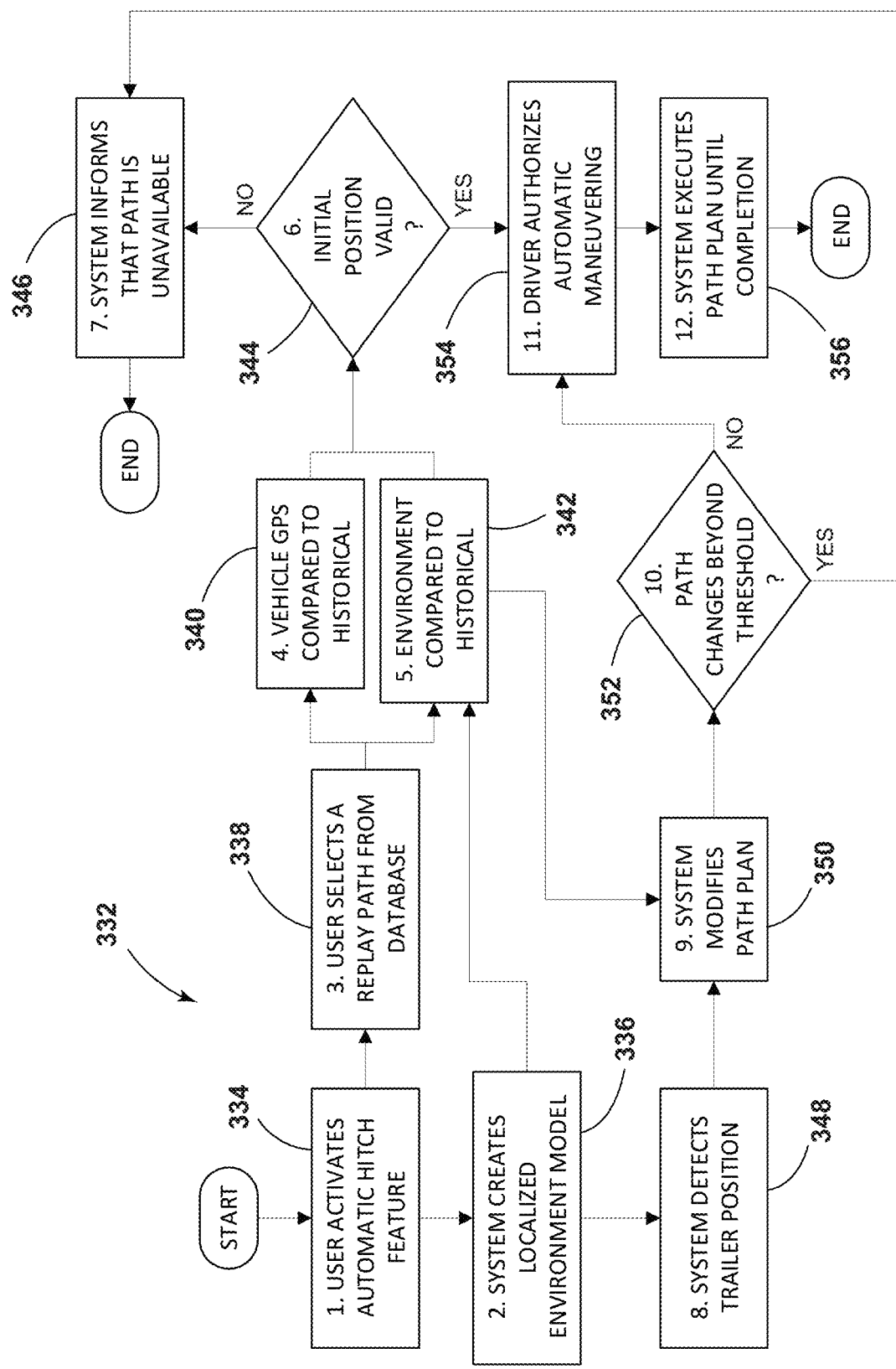
FIG. 15 is a flowchart depicting a method for using a stored initial alignment path in aligning the vehicle with the trailer.
Figure 16:
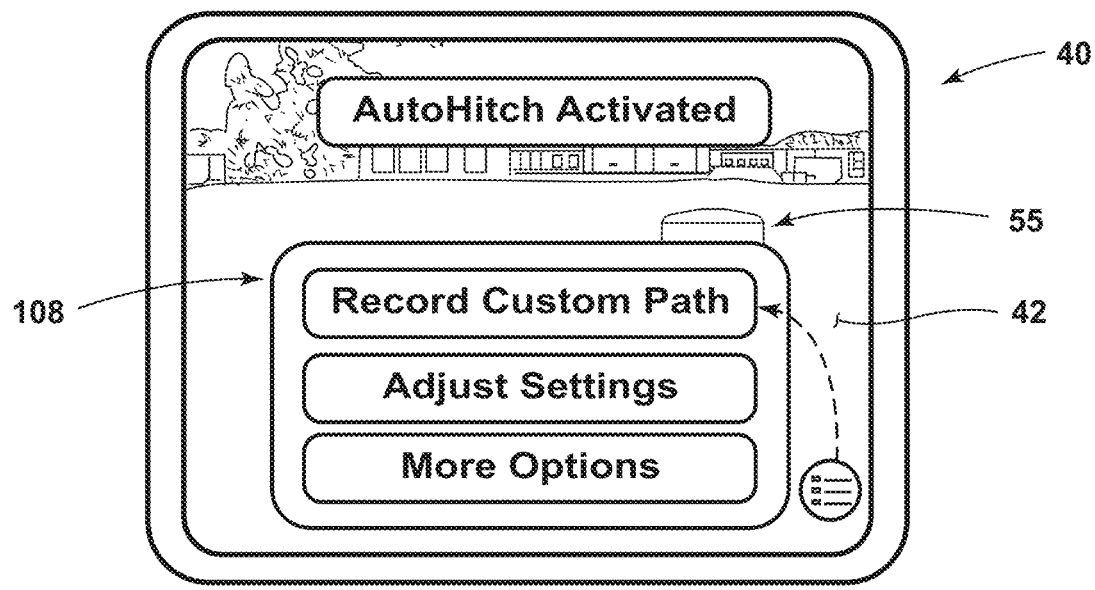
FIG. 16 is a depiction of a message presentable by the system to a user giving the user an option to record an alignment path to a trailer.

Turning now to FIG. 15, a method 332 for hitching vehicle 12 with a selected trailer 16 based on a recorded path 32' begins on a subsequent initiation of an automated backing maneuver using system 10 (step 334). Upon system 10 activation, controller 26 creates a map of the area surrounding vehicle 12 (step 336) using data from vehicle 12 sensors, including radar data 100 from radar system 102 and, optionally, data from the proximity sensor array 54, such data being useable in subsequent method steps discussed further below. The user may then select the "replay" mode for operation of system 10 using vehicle HMI 40, for example (step 338), or by a remote device including smartphone 96 or the like. The user may then select one of whatever number of recorded initial alignment paths 32' that are stored in memory 62, including by HMI 40 or smartphone 96. Once an initial alignment path 32' is selected, controller 26 retrieves the path 32' data, including that of the initial vehicle 12 position saved in step 318 above. Controller 26 then evaluates the current position of vehicle 12 to determine if the selected path 32' can be replayed. In particular, controller 26 compares the GPS data (i.e., the localized GPS coordinates) with the corresponding saved data associated with the selected path 32' (step 340). If the current position of vehicle 12 differs from the corresponding stored data beyond a preset threshold amount (absolute or percentage), the system 10 will not replay the path 32' as the recorded path is, understandably, only valid for the particular location from which the recording was initiated. A corresponding message 112 (FIG. 20) can be presented to the user via HMI 40 (step 346). Additionally, controller 26 evaluates the environment model obtained in step 336 to determine if the model generally matches the recorded model (step 342). Certain discrepancies are permitted in such evaluation, such as new objects, as these may be addressed by modifying the path (step 350). If step 342 indicates a divergence between the current scenario and the recorded scenario (i.e., that cannot be adjusted around), the system 10 will also not proceed (step 346).

Figure 21:
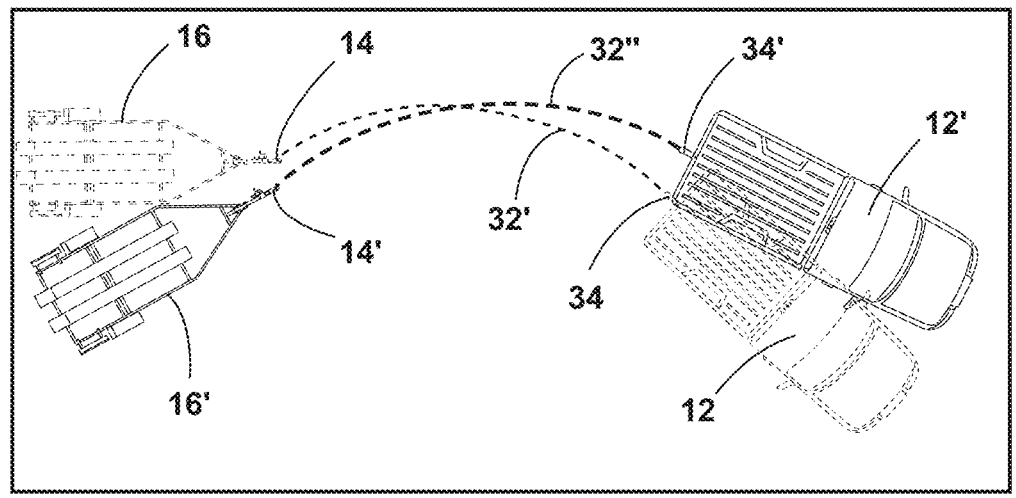
FIG. 21 is a schematic depiction of an adjustment of a recorded alignment path to compensate for at least one of trailer or vehicle positioning.

If the replay mode is determined to be possible, controller 26 begins attempting to detect the subject trailer 16 in the image data 55. As discussed above, the replayed path 32' is used as an initial alignment path, as discussed above with respect to FIGS. 8 and 9, such that at some point during the alignment maneuver, the trailer 16 will have to be identified for maneuvering of vehicle 12 along the actual path 32 to align with the detected trailer 16 and coupler 14. In this manner, controller 26 uses the image processing routine 64 to identify trailer 16 and transition to using the appropriately generated path 32 thereto as soon as possible (step 350). As discussed above, both the initial detected vehicle 12 position (step 336) and detected trailer 16 position (step 348) are used to adjust the path 32" in step 350, as shown in the example of FIG. 21.

Figure 22:
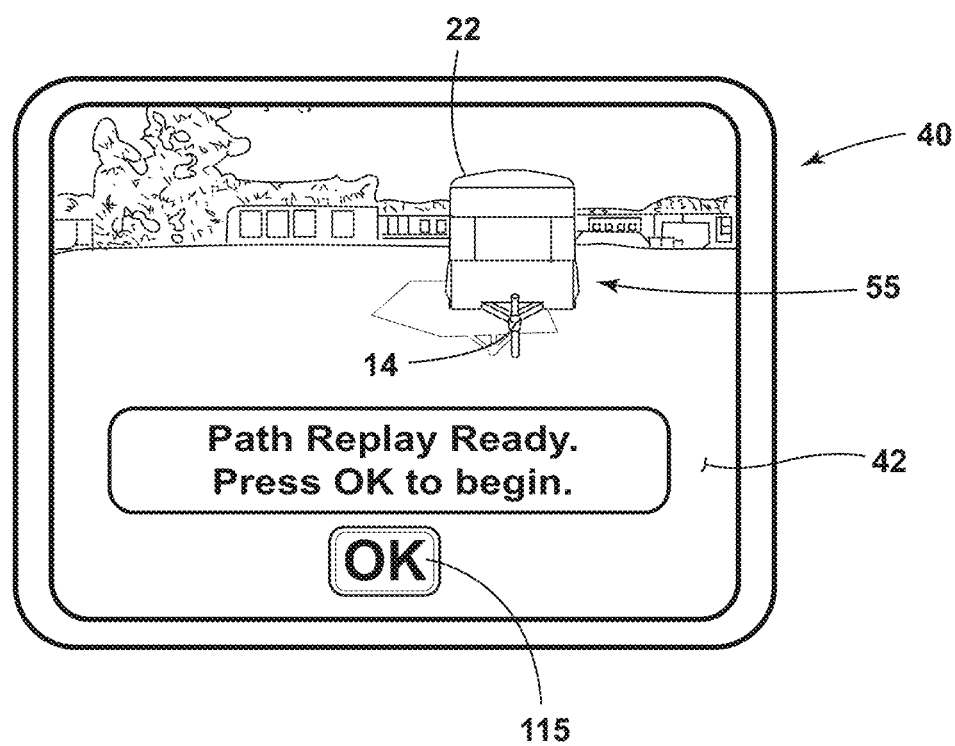
FIG. 22 is a depiction of a confirmation message presentable by the system prior to executing an automated backing maneuver using a recorded path.
Figure 23:
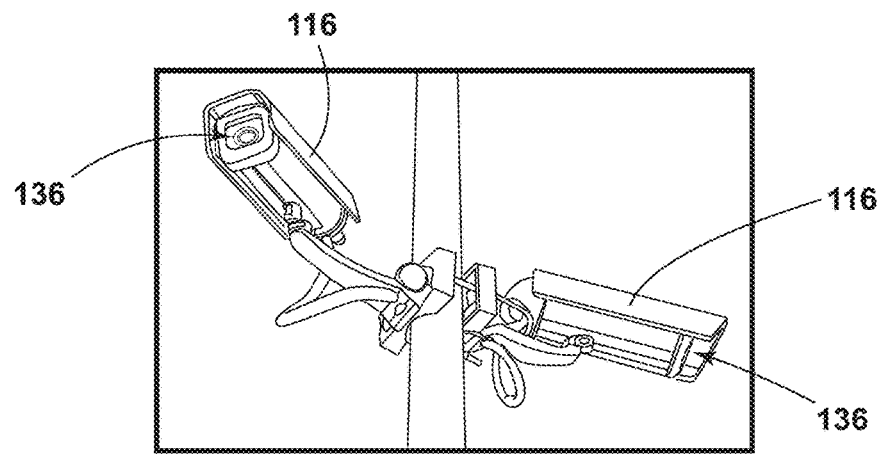
FIG. 23 is an example of external wireless cameras useable by the system in completing an automated backing maneuver using external data.

Subsequently, system 10 requests (step 354) that the driver authorize automated motion control, including by another message 114 on HMI 40 (FIG. 22). Once confirmation is received from the driver, controller runs operating routine 68 using the modified path 32" then automatically follows the modified recorded path 32" to back vehicle toward trailer 16, with continuous adjustments being made once trailer 16 is detected in image data 55. Once image processing routine 64 detects that alignment of hitch ball 34 with coupler 14 has been achieved (step 356), the vehicle 12 is stopped and the process 332 ends.

Turning to FIGS. 23-26, an additional aspect of the system 10, as presently disclosed, may include or otherwise make use of a wireless communication module 94 within vehicle 12 and communicatively coupled with controller 26 for connection with an external data source, such as wireless camera 116 configured for wireless transmission of external image data 155. In various implementations, the wireless communication module 94 can include a wireless transceiver operating according to various protocols by corresponding circuitry and components. Such protocols can include, but are not limited to, Bluetooth®, WiFi, radio frequency ("RF"), and the like. System 10 and the external camera 116 are configured such that system 10 has the ability to locate a trailer 16 relative to vehicle 12 when the location of the trailer 16 is not pre-stored in memory 62. In this manner, an initial alignment maneuver can include determining a preliminary trailer position and/or a preliminary coupler location 28' using data received from external camera 116 via the wireless communication module 94. Data regarding wireless camera 116 can be obtained by a calibration step in a pairing process 410 (FIG. 25), such that image data 155 from camera 116 can be used to identify the trailer 16 and/or coupler 14 relative to wireless camera 116 (using image processing routine 64 in connection with known characteristics of camera 116), the location of which is known to controller 26 for location of trailer 16 relative to vehicle 12. Controller 26 can, thusly, use the external image data 155 to determine the initial trailer location 160 and or the initial coupler location 28' relative to vehicle 12 for movement of the vehicle 12 through the derived initial alignment path 32' to place vehicle 12 in a position where the trailer 16 can be expected to be in the field of view 49 of camera 48 and in an acceptable range from vehicle for use of the standard image processing routine 64, path derivation routine 66, and operating routine 68 to align hitch ball 34 with coupler 14. In various examples, vehicle 12 may be parked at a suboptimal angle with respect to the trailer 16 (or too far away from trailer 16) but in a position where both the trailer 16 and the vehicle 12 are within sight of the camera 116 (FIGS. 24A and 24B). In such a scenario, an automated hitching operation may still be initiated.

To set up one or more wireless cameras 116 (in established fixed positions) for use with system 10, a method 410 can include the user choosing an option within system 10 functionality (e.g. via a menu on HMI 40) to setup pairing with an external camera 116 (step 412). The camera 116, like wireless communication module 94, may communicate (i.e., for transmission of the external image data 155) over a WiFi, Bluetooth, or other connection. In certain implementations of system 10, controller 26 may be able send control commands to the wireless camera 116, such as to turn on or to adjust any dynamic settings like focus, color balancing, etc. Using the particular protocol available between wireless communication module 94 and wireless camera 116, a link is established there between (step 414). The link is saved to memory 62 for future use. In an implementation, the camera 116 may have associated password protection that can be associated with the link in a similar manner as to how a mobile phone remembers previous WiFi router connections. Once connected, system 10 operates to coordinate the position of various points in the external image data 155 with corresponding points in the real-world (at least in association with vehicle 12). This allows system 10 to determine the position of a detected trailer 16 relative to the vehicle 12. There are a number of processes that can be implemented for such calibration. In one aspect, wireless camera 116 can be GPS-enabled with additional capability to automatically detect the viewing angle thereof. If combined with ground detection within image processing routine 64, for example, wireless camera 116 is able to generate an estimate of the location (relative to the GPS coordinates of wireless camera 116) for detected objects in view of wireless camera 116. For such a wireless camera 116, in the calibration step 416, the vehicle 12 can be driven into the view of the wireless camera 116, such as in the vicinity of the expected location for a trailer 16. Controller 26 can then perform vision processing on the external image data 155 to detect the vehicle 12. The position of the detected vehicle 12 within the image data 155 can be associated with the GPS location of the vehicle 12, as obtained from controller 26 from GPS module 25. This step 416 may be performed once or multiple times from multiple positions, depending on the accuracy of the measurement (and/or a certainty evaluation thereof). If the calibration routine is completed successfully (step 418), the user is notified (step 422), and the data obtained from the wireless camera 116 is saved in memory 62. If the calibration is determined to be unsuccessful, the user is also notified (step 420) with no camera information being saved. In an alternative implementation of step 416, a "target image" can be used to allow the system to detect the appearance of a known image (such as an OEM-provided bullseye printed on a sheet of paper). The image may be placed in view of the wireless camera 116. The position of the target image is provided to the vehicle during the calibration step 416, thus calibrating the positional reference of the external image data 155.

Figure 26:
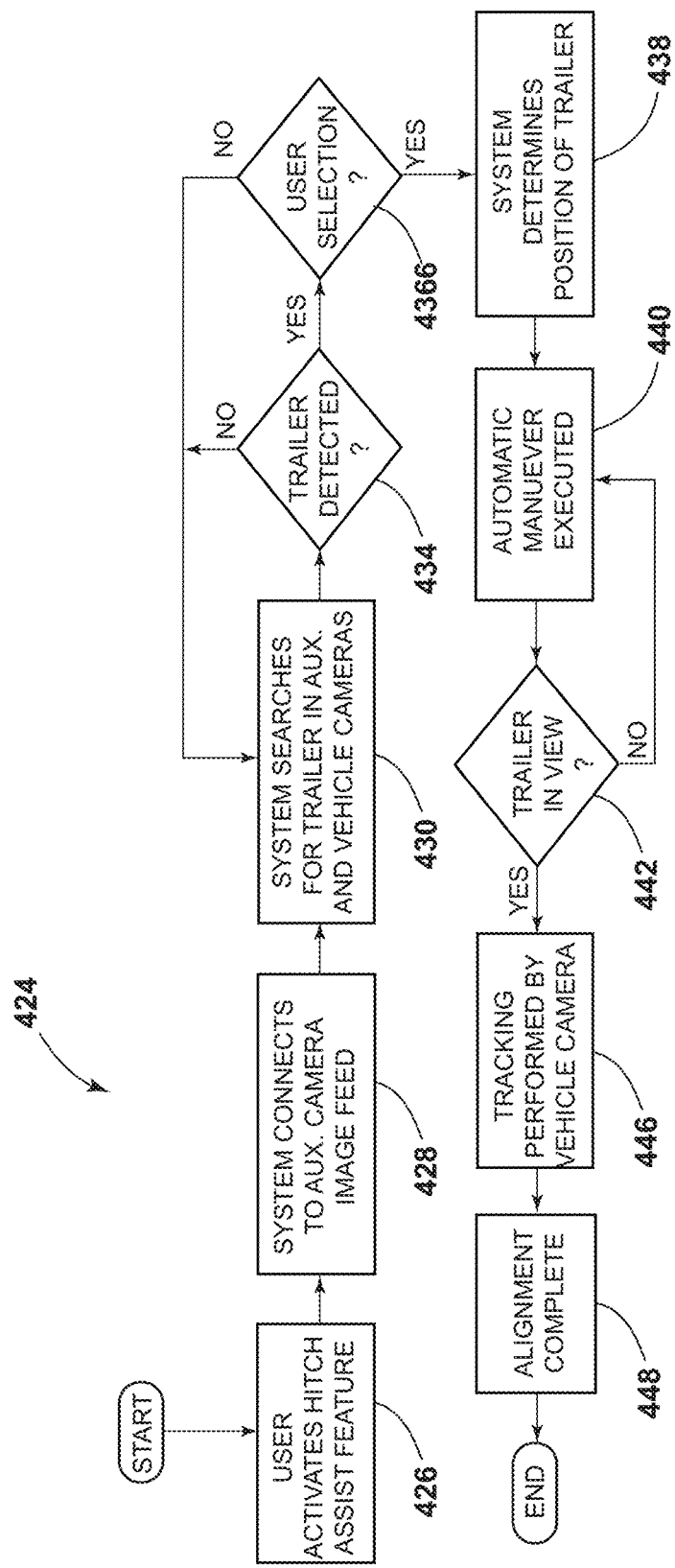
FIG. 26 is a flowchart depicting a method for using external image data from a paired wireless camera in aligning a vehicle with a trailer.

Turning to FIG. 26, an external camera 116, paired according to the process 410 discussed above is then useable in an automated hitching maneuver according to the illustrated process 424. In one implementation, process 424 is initiated by the user activating system 10 functionality on the vehicle HMI 40 or via remote device 96 (step 426). System 10 then automatically connects to any external cameras that were previously paired, successfully calibrated, and within the range of the wireless communication module 94 (step 428). In an alternate implementation of step 428, the user can choose to connect to an identified, available wireless camera 116. This implementation may allow system 10 to infer that that the desired subject trailer 16 is in the view of the wireless camera 116 and can, therefore, disregard any other trailers 16 identified by vehicle camera 48, for example, or any other available wireless cameras 116. Once connection with one or more wireless cameras 116 is established, controller 26 can run image processing routine 64 on the incoming external image data 155, as well as the vehicle camera(s) 48, 50, 52a, 52b, to detect and classify any trailers 16 in the combined image data 55 and 155 (step 430). Depending on the particular setting, multiple trailers 16 may be detected. If no trailers 16 are detected (step 434), controller 26 continues to search, while the driver is able to reposition the vehicle 12 (or select another wireless camera 116) until a trailer 16 is found. If a trailer is detected (step 434), the user can confirm the detection via the HMI 40 (or by another action such as shifting the powertrain system 72 to Neutral) (step 436). If multiple trailers 16 are detected, system 10 may allow the user to indicate (such as on HMI 40) which trailer is the desired subject of the hitching maneuver (step 436). With the desired subject trailer 16 identified, controller 26 estimates the position of the trailer 16 within the image data 55 and/or 155. If the results of the image processing routine 64 indicate trailer 16 within the view of wireless camera 116 only, the calibration of the camera 116 (the data of which can be retrieved from memory 62) allows controller 26 to estimate the trailer 16 position relative to vehicle 12 (step 438). This relative positioning can be used by controller 26 in generating the initial alignment path 32' (step 440) to move vehicle 12 toward trailer 16, such that trailer 16 is within the target zone 45. Controller 26 then controls vehicle 12 to maneuver along the initial alignment path 32' (e.g., as shown in FIG. 9) towards the trailer 16, with controller 26 continuing to look for the trailer in the vehicle image data 55 (step 442).

As the trailer 16 comes nearer to the vehicle 12, it enters the field of view 49 of cameras 48, for example. Once this occurs, particularly such that trailer 16 and/or coupler 14 is in the target zone 45 (FIG. 7), controller 26 switches to using the image data 55 from camera 48 for image processing 64 and to develop the actual alignment path 32, using path derivation routine 66 (step 446). Controller 26 then continues the backing maneuver using the actual path 32 in operating routine 68 until vehicle 12 reaches the end 35 of path 32 (step 448).

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   a vehicle steering system;
   a detection system positioned within the vehicle and including a camera mounted on the vehicle and outputting a signal including visual scene data of a vehicle camera field of view extending from the camera to a rear of the vehicle; and
   a controller:

positioned within the vehicle;
receiving the visual scene data and attempting to identify the trailer within the vehicle camera field of view;
deriving an initial alignment path to move the vehicle relative to the trailer from an initial position wherein the trailer is outside of the vehicle camera field of view to a subsequent position wherein the trailer is within the vehicle camera field of view, wherein:
the initial alignment maneuver is based on a predetermined maneuver stored in memory associated with the controller, during an alignment maneuver recording process wherein the controller tracks a user-controlled backing maneuver of the vehicle; and
the controller recognizes a user-controlled retry maneuver during the alignment maneuver and removes the retry maneuver from the predetermined maneuver before storing the predetermined maneuver in the internal memory;
controlling the vehicle steering system from within the vehicle to maneuver the vehicle according to an initial alignment maneuver that moves the vehicle along the initial alignment path until the controller identifies the trailer within the vehicle camera field of view; and
responsive to identifying the trailer within the vehicle camera field of view, completing an automated alignment maneuver, including:
deriving a backing path to align a hitch ball mounted on the vehicle to a coupler of the trailer for connection of the coupler with the hitch ball; and
controlling the vehicle steering system from within the vehicle to maneuver the vehicle including reversing along the backing path.

2. The system of claim 1, wherein the initial alignment maneuver is further derived using data that is obtained from internal memory associated with the controller, the data including location information from the trailer outside of the vehicle camera field of view.

3. The system of claim 1, wherein the initial alignment maneuver is further based on the controller:
retrieving a stored location of the trailer from internal memory associated with the controller; and
comparing a position of the vehicle with the stored location of the trailer.

4. The system of claim 3, wherein a location of the trailer is stored in the memory associated with the controller as the stored location of the trailer upon the controller detecting that the trailer is initially uncoupled from the vehicle upon starting the vehicle subsequent to the vehicle being turned off with a trailer in a connected state.

5. The system of claim 1, further including a GPS module, wherein:
the controller tracks the user-controlled backing maneuver using information received from the GPS module and a steering angle sensor included in the vehicle steering system.

6. The system of claim 1, wherein the controller derives the initial alignment maneuver by adjusting the predetermined maneuver stored in memory according to a current detected position of the vehicle.

7. The system of claim 1, wherein removing the retry maneuver from the predetermined maneuver includes maintaining one of a maneuver end point and a vehicle heading angle in the predetermined maneuver.

8. A system for assisting in aligning a vehicle for hitching with a trailer, comprising:
a vehicle steering system;
a detection system positionable within the vehicle and including a camera outputting a signal including visual scene data of a vehicle camera field of view extending from the camera to a rear of the vehicle; and
a controller:
positionable within the vehicle;
storing a predetermined maneuver in memory associated with the controller during an alignment maneuver recording process wherein the controller tracks a user-controlled backing maneuver of the vehicle and recognizes a user-controlled retry maneuver during the alignment maneuver and removes the retry maneuver from the predetermined maneuver before storing the predetermined maneuver in the internal memory;
receiving the scene data and attempting to identify the trailer within the vehicle camera field of view;
controlling the vehicle steering system from within the vehicle to maneuver the vehicle according to an initial alignment maneuver derived from the predetermined maneuver, the initial alignment maneuver moving the vehicle along the initial alignment path from an initial position wherein the trailer is outside of the camera field of view until the controller identifies the trailer within the vehicle camera field of view; and
responsive to identifying the trailer within the vehicle camera field of view:
deriving a backing path to align a hitch ball mounted on the vehicle to a coupler of the trailer; and
controlling the vehicle steering system from within the vehicle to maneuver the vehicle including reversing along the backing path.

9. The system of claim 8, wherein the initial alignment maneuver is further derived from a stored location of the trailer by comparing a position of the vehicle with the stored location of the trailer.

10. The system of claim 9, wherein a location of the trailer is stored in memory associated with the controller as the stored location of the trailer upon the controller detecting that the trailer is initially uncoupled from the vehicle upon starting the vehicle subsequent to the vehicle being turned off with a trailer in a connected state.

11. The system of claim 8, wherein the initial alignment maneuver is further derived by adjusting the predetermined maneuver stored in memory according to a current detected position of the vehicle.

12. The system of claim 11, wherein the predetermined maneuver is stored in memory during an alignment maneuver recording process wherein the controller tracks a user-controlled backing maneuver of the vehicle.

13. The system of claim 12, further including a GPS module, wherein:
the controller tracks the user-controlled backing maneuver using information received from the GPS module and a steering angle sensor included in the vehicle steering system.

14. The system of claim 8, wherein the controller maintains one of a maneuver end point and a vehicle heading angle in the predetermined maneuver.

15. A system for assisting in aligning a vehicle for hitching with a trailer, comprising:
a vehicle steering system;

a camera mounted on the vehicle and outputting a signal including visual scene data of a vehicle camera field of view extending from the camera to a rear of the vehicle; and a controller and associated memory positioned within the vehicle:

tracking a user-controlled backing maneuver of the vehicle using information from the GPS unit;

deriving an initial alignment path to move the vehicle relative to the trailer from an initial position, wherein the trailer is outside of the vehicle camera field of view, to a hitching position, wherein the trailer is within the vehicle camera field of view and a hitch ball of the vehicle is spaced from a coupler of the trailer at a distance sufficient to start an automated operating routine, using a data stored in the associated memory, wherein the data stored in the associated memory is a predetermined maneuver that is stored in the associated memory during an alignment maneuver recording process, the initial alignment path is derived from the data stored in the associated memory by adjusting the predetermined maneuver stored in memory according to a current detected position of the vehicle, the controller recognizing a retry maneuver during the alignment maneuver recording process and removing the retry maneuver from the predetermined maneuver before storing the predetermined maneuver in the associated memory and maintaining one of a maneuver end point and a vehicle heading angle in the predetermined maneuver;

controlling the vehicle steering system from within the vehicle to maneuver the vehicle according to the initial alignment maneuver;

receiving the visual scene data and identifying the trailer within the vehicle camera field of view; and responsive to identifying the trailer within the vehicle camera field of view, completing an automated alignment maneuver, including:

deriving a backing path to align a hitch ball mounted on the vehicle to a coupler of the trailer for connection of the coupler with the hitch ball; and controlling the vehicle steering system from within the vehicle to maneuver the vehicle including reversing along the backing path.

* * * * *